(12) United States Patent
Tanaka et al.

(10) Patent No.: US 10,753,812 B2
(45) Date of Patent: Aug. 25, 2020

(54) MAGNETIC TORQUE DETECTOR

(71) Applicant: DENSO CORPORATION, Kariya, Aichi-pref. (JP)

(72) Inventors: Ken Tanaka, Kariya (JP); Shingo Shimizu, Nisshin (JP); Toshiro Suzuki, Kariya (JP); Satoru Jinno, Kariya (JP); Shigetoshi Fukaya, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/232,643

(22) Filed: Dec. 26, 2018

(65) Prior Publication Data

US 2019/0212216 A1  Jul. 11, 2019

(30) Foreign Application Priority Data

Dec. 27, 2017 (JP) .................................. 2017-252532

(51) Int. Cl.
  *G01L 3/00* (2006.01)
  *G01L 3/10* (2006.01)
  *G01L 3/24* (2006.01)

(52) U.S. Cl.
  CPC .............. *G01L 3/104* (2013.01); *G01L 3/102* (2013.01); *G01L 3/105* (2013.01); *G01L 3/242* (2013.01)

(58) Field of Classification Search
  CPC ......... G01L 3/104; G01L 3/102; G01L 3/105; G01L 5/221; G01L 3/10; G01L 3/101; G01L 3/242; G01L 3/14

USPC ................................................... 73/862.325
  See application file for complete search history.

(56) References Cited

U.S. PATENT DOCUMENTS

| | | | | |
|---|---|---|---|---|
| 4,479,390 | A * | 10/1984 | Meixner | G01L 3/102 73/862.333 |
| 2002/0189371 | A1 | 12/2002 | Nakane et al. | |
| 2003/0037622 | A1* | 2/2003 | Laidlaw | G01L 5/221 73/862.333 |
| 2003/0155627 | A1* | 8/2003 | Fukaya | B62D 6/10 257/467 |
| 2006/0137474 | A1 | 6/2006 | Nakane et al. | |
| 2008/0092670 | A1* | 4/2008 | Tokumoto | G01L 3/104 73/862.191 |
| 2009/0211374 | A1* | 8/2009 | Oike | G01D 5/145 73/862.08 |
| 2012/0227514 | A1* | 9/2012 | Ueda | G01D 5/2457 73/862.325 |
| 2017/0108411 | A1* | 4/2017 | Komuro | B62D 15/0215 |

* cited by examiner

*Primary Examiner* — Max H Noori
(74) *Attorney, Agent, or Firm* — Maschoff Brennan

(57) ABSTRACT

A torque detector detects a torsional torque between a first shaft and a second shaft based on a torsional displacement of an elastic member coaxially connecting the first shaft and the second shaft. The torque detector includes a magnetic flux generation unit and a magnetic sensor. The magnetic flux generation unit rotates with rotation of the first shaft and includes a first pole and a second pole into and out of which lines of magnetic force enter and exit. The magnetic sensor rotates with rotation of the second shaft and includes a detection surface for detecting a magnetic flux or a magnetic flux density. The first pole and the second pole are arranged to face each other across the magnetic sensor.

18 Claims, 13 Drawing Sheets

MAGNETIC TORQUE DETECTOR

CROSS REFERENCE TO RELATED APPLICATION

The present application claims the benefit of priority from Japanese Patent Application No. 2017-252532 filed on Dec. 27, 2017. The entire disclosure of the above application is incorporated herein by reference.

TECHNICAL FIELD

The present disclosure relates to a torque detector for detecting a torsional torque.

BACKGROUND

Conventionally, it has been known that a torque detector (torque sensor) for detecting a torsional torque (shaft torque) is used in an electric power steering device or the like.

SUMMARY

According to at least one embodiment of the present disclosure, a torque detector detects a torsional torque between a first shaft and a second shaft based on a torsional displacement of an elastic member coaxially connecting the first shaft and the second shaft. The torque detector includes a magnetic flux generation unit configured to rotate with rotation of the first shaft and including a first pole and a second pole into and out of which lines of magnetic force enter and exit, and a magnetic sensor configured to rotate with rotation of the second shaft and including a detection surface for detecting a magnetic flux or a magnetic flux density. The first pole and the second pole are arranged to face each other across the magnetic sensor.

DETAILED DESCRIPTION

First Embodiment

Figure 1:
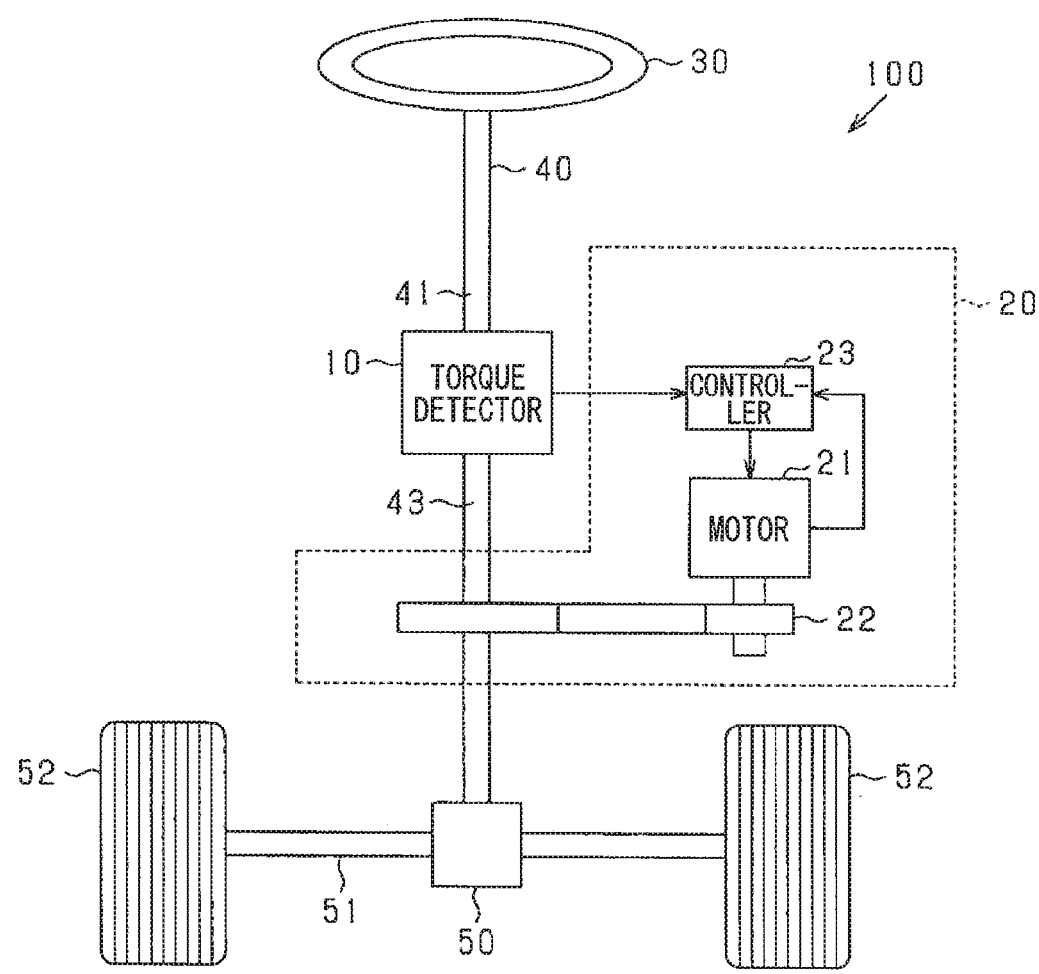
FIG. 1 is a schematic diagram of a steering system according to at least one embodiment.

Embodiments of the present disclosure will be described below with reference to the drawings. In the following embodiments, the same or equivalent parts are denoted by the same reference numerals in the drawings.

<Steering System 100>

A torque detector 10 according to an embodiment will be described with reference to the drawings. As shown in FIG. 1, the torque detector 10 is used, for example, in a steering system 100 including an electric power steering device 20 for assisting a steering operation of a vehicle.

Figure 2:
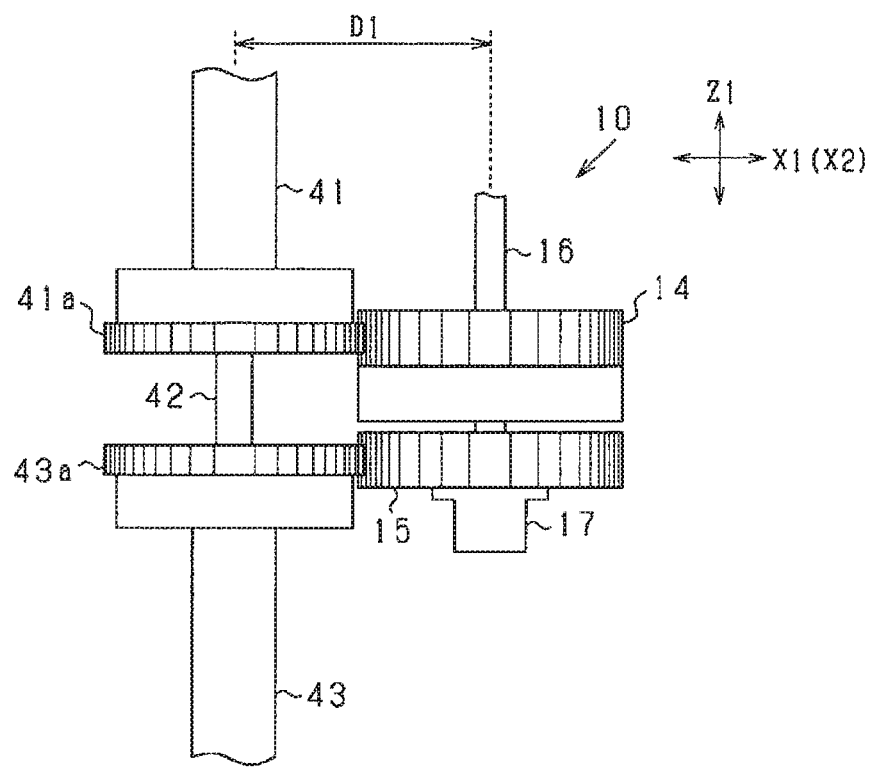
FIG. 2 is a side view of a torque detector.

A steering wheel 30 is connected to a steering shaft 40. As shown in FIG. 2, the steering shaft 40 has an input shaft 41 as a first shaft connected to the steering wheel 30, a torsion bar 42 connected to the input shaft 41, and an output shaft 43 as a second shaft connected to the input shaft 41 through the torsion bar 42. The first shaft and the second shaft may be interchanged with each other.

One end of the torsion bar 42 is connected to an input shaft 41 and the other end of the torsion bar 42 is connected to an output shaft 43, through respective fixing pins (not shown), and connects the input shaft 41 and the output shaft 43 coaxially. The torsion bar 42 is a rod-shaped elastic member, and is torsionally displaced in accordance with a torsional torque applied to the steering shaft 40 to store an elastic force. As shown in FIG. 1, a torque detector 10 for detecting a torsional torque applied to the torsion bar 42 (that is, the steering shaft 40) is provided between the input shaft 41 and the output shaft 43.

A pinion gear 50 is provided at a tip of the output shaft 43, and the pinion gear 50 is engaged with a rack shaft 51. A pair of wheels 52 is connected to both ends of the rack shaft 51 through tie rods or the like. With the above configuration, when the driver rotates the steering wheel 30, the steering shaft 40 connected to the steering wheel 30 rotates. When the steering shaft 40 rotates, the rack shaft 51 is linearly moved in a left-right direction by the pinion gear 50. The pair of wheels 52 is steered in accordance with the displacement amount of the rack shaft 51.

The electric power steering device 20 includes a motor 21 for outputting an assisting torque for assisting steering of the steering wheel 30 by a driver, a reduction gear 22, a control device 23, and the like. The reduction gear 22 reduces the rotation of the motor 21 and transmits the decelerated rotation to the steering shaft 40. In the present embodiment, although a column assist type is used, a pinion assist type that transmits the rotation of the motor 21 to the pinion gear 50, or a rack assist type that transmits the rotation of the motor 21 to the rack shaft 51 may be used. The control device 23 receives a voltage signal indicating a torsional torque from the torque detector 10, and controls the driving of the motor 21 in accordance with an acquired voltage signal.

In the following description, simple indication of an axial direction means an axial direction of the steering shaft 40 (including the input shaft 41, the torsion bar 42, and the output shaft 43: hereinafter, the same applies). In addition, simple indication of a radial direction means a radial direction of the steering shaft 40. In the drawing, the axial direction of the steering shaft 40 is indicated by an arrow Z1, and the radial direction of the steering shaft 40 is indicated by an arrow X1.

<Torque Detector 10>

Figure 3:
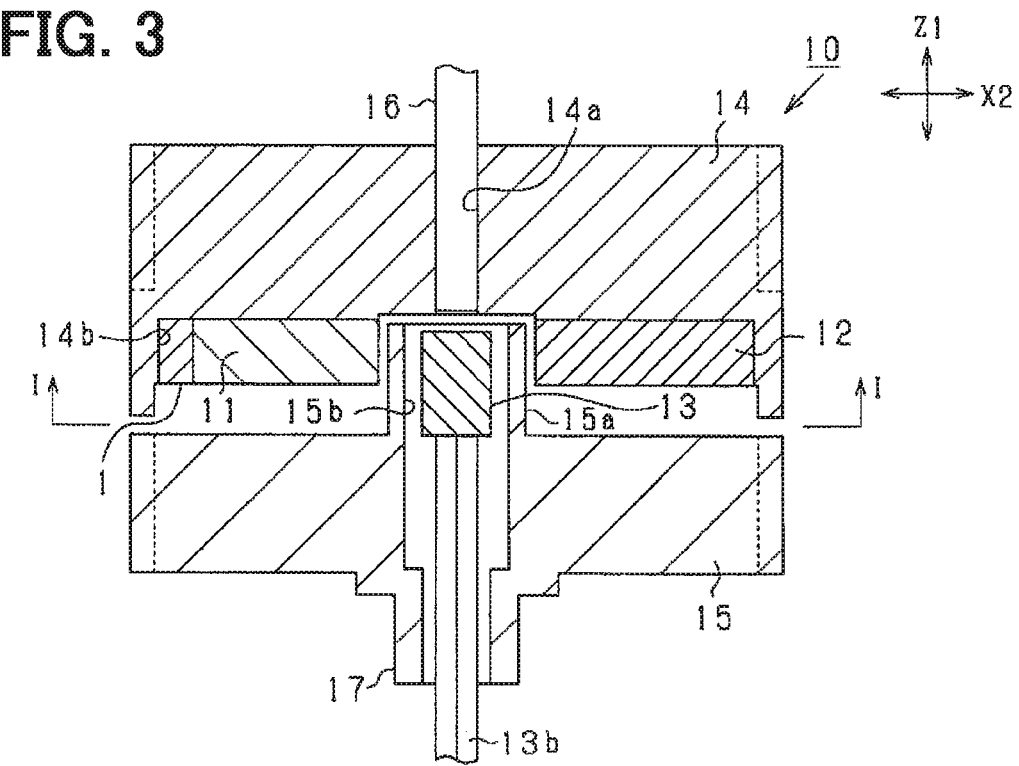
FIG. 3 is a vertical cross-sectional view of the torque detector.

As shown in FIG. 3, the torque detector 10 includes a magnetic flux generation unit 1 for generating a magnetic flux, a magnetic sensor 13 having a detection surface for detecting a magnetic flux density (or a magnetic flux), and the like. More specifically, the magnetic flux generation unit 1 includes a magnet 11 and a magnetic yoke 12. As shown in FIG. 2, the torque detector 10 includes a first coupling portion 14 for coupling a magnet 11 and a magnetic yoke 12 to the input shaft 41, and a second coupling portion 15 for coupling the magnetic sensor 13 to the output shaft 43.

<First Coupling Portion 14>

As shown in FIG. 2, the first coupling portion 14 is a gear (spur gear) formed in a disc shape and provided with teeth on an outer circumference, and is configured to rotate about a first rotation shaft 16. The first rotation shaft 16 is provided on the radially outer side of the steering shaft 40 and is along (parallel to) the steering shaft 40.

The first coupling portion 14 is fixed to the outer periphery of the input shaft 41, and is configured to mesh with a first gear 41a rotating integrally with the input shaft 41. The first coupling portion 14 is rotatably fixed to the first rotation shaft 16 in conjunction with the first gear 41a. That is, the first coupling portion 14 is coupled to the input shaft 41 so as to rotate in conjunction with the rotation of the input shaft 41.

A gear ratio (speed reduction ratio) of the first coupling portion 14 to the first gear 41a is 1:1. In other words, a ratio of the rotation of the first coupling portion 14 to the rotation of the input shaft 41 is 1:1, and when the input shaft 41 makes one rotation, the first coupling portion 14 also makes one rotation. A shaft hole 14a extending along the axial direction is provided in the center of the first coupling portion 14, and the first rotation shaft 16 of the first coupling portion 14 is inserted into the shaft hole 14a, so that the first coupling portion 14 is rotatably fixed.

As shown in FIG. 3, the first coupling portion 14 is formed in a bottomed cylindrical shape. That is, the first coupling portion 14 is formed with an accommodating recess portion 14b along the axial direction. The accommodating recess portion 14b is open toward the output shaft 43. A magnetic yoke 12 and a magnet 11 are accommodated in the accommodating recess portion 14b.

<Magnetic Yoke 12>

Figure 4:
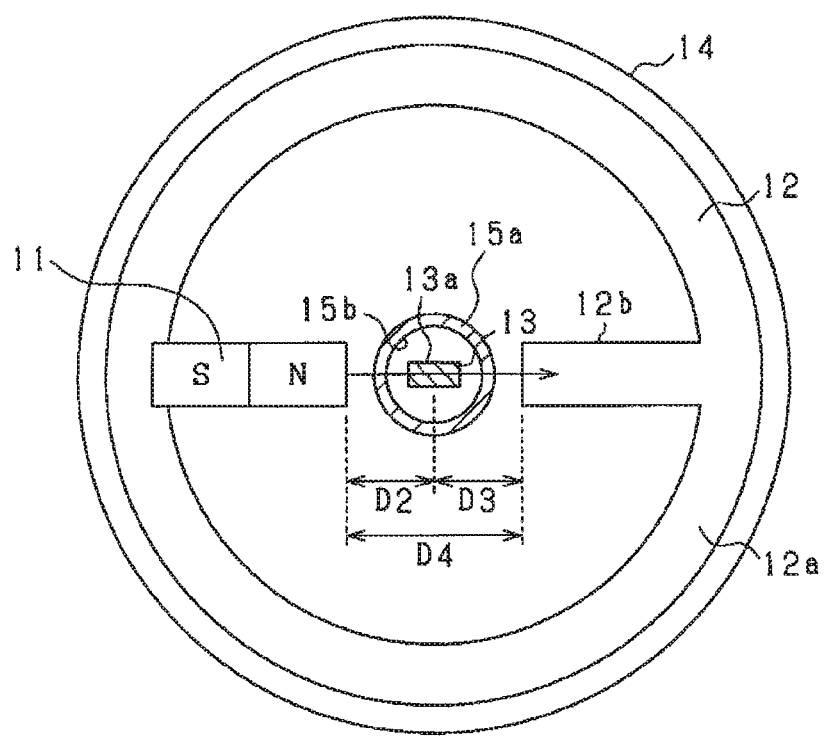
FIG. 4 is a cross-sectional view of the torque detector taken along a line I-I.

The magnetic yoke 12 shown in FIGS. 3 and 4 is made of a soft magnetic material, such as iron or permalloy, and is formed in an annular shape. In the drawing, the radial direction of the magnetic yoke 12 is indicated by an arrow X2. FIG. 4 is a diagram of the magnetic yoke 12 when viewed from the output shaft 43.

The magnetic yoke 12 is accommodated in the accommodating recess portion 14b of the first coupling portion 14. In this case, the magnetic yoke 12 is housed in the accommodating recess portion 14b and is fixed to the first coupling portion 14 so that the center of the magnetic yoke 12 coincides with the rotation center (the first rotation shaft 16) of the first coupling portion 14. For that reason, when the first coupling portion 14 rotates in conjunction with the rotation of the input shaft 41, the magnetic yoke 12 rotates integrally with the first coupling portion 14 about the first rotation shaft 16 of the first coupling portion 14. In other words, the magnetic yoke 12 is coupled to the input shaft 41 through the first coupling portion 14 so as to rotate in conjunction with the rotation of the input shaft 41.

Therefore, the center of the magnetic yoke 12 provides the rotation center, and the rotation center (rotation shaft) of the magnetic yoke 12 extends along (parallel to) the steering shaft 40 on the radially outer side of the steering shaft 40. More specifically, as shown in FIG. 2, the rotation center of the magnetic yoke 12 is disposed at a position separated from the steering shaft 40 radially outward by a predetermined distance D1.

As shown in FIG. 4, a facing portion 12b facing a magnet 11, which will be described later, is provided on an inner edge of an annular portion 12a configuring the magnetic yoke 12. The facing portion 12b is formed so as to project to radially inner side of the magnetic yoke 12 from an inner edge of the annular portion 12a (toward the rotation center). In the radial direction of the magnetic yoke 12 (annular portion 12a), a length of the facing portion 12b is set to be shorter than a length from an inner edge of the annular portion 12a to a rotation center of the magnetic yoke 12. In the present embodiment, the facing portion 12b is formed in a quadrangular prism shape, but the present disclosure is not limited to the above shape, but may have a columnar shape or a polygonal prism shape.

<Magnet 11>

The magnet 11 is made of a hard magnetic material and formed in a bar shape. In a longitudinal direction of the magnet 11, one end is magnetized so as to be an N pole magnetic pole (one magnetic pole), and the other end is magnetized so as to be an S pole magnetic pole (the other magnetic pole).

The magnet 11 is disposed inside the magnetic yoke 12 such that a longitudinal direction of the magnet 11 is oriented along (parallel to) the radial direction of the magnetic yoke 12 (more specifically, the annular portion 12a). In this case, the magnet 11 is disposed so as to overlap with the magnetic yoke 12 in the axial direction. Specifically, one end (S pole) of the magnet 11 is connected to the inner edge of the annular portion 12a, and an N pole of the magnet 11 is fixed so as to face the rotation center. The length of the magnet 11 in the longitudinal direction (the length of the magnetic yoke 12 in the radial direction) is set to be shorter than the length from the inner edge of the annular portion 12a to the rotation center of the magnetic yoke 12.

The magnet 11 is fixed so that the N pole of the magnet 11 faces the facing portion 12b across the rotation center of the magnetic yoke 12. According to the present embodiment, the magnet 11 is fixed to the annular portion 12a of the magnetic yoke 12 at a position 180 degrees away from the position where the facing portion 12b is provided. Therefore, the facing portion 12b is formed so as to project from the inner edge of the magnetic yoke 12 toward the N pole of the magnet 11.

A distance D2 from the N pole of the magnet 11 to the rotation center of the magnetic yoke 12 is set to be the same as a distance D3 from the tip of the facing portion 12b to the rotation center of the magnetic yoke 12. Therefore, the N pole of the magnet 11 and the facing portion 12b of the magnetic yoke 12 are disposed at positions facing each other across the rotation center of the magnetic yoke 12 with a predetermined distance D4 (=D2+D3). Further, it is desirable that a distance from the N pole of the magnet 11 to the inner edge of the annular portion 12a is longer than the distance D4 to the facing portion 12b.

Relative positions of the magnet 11 and the magnetic yoke 12 are fixed. In other words, when the first coupling portion 14 rotates in conjunction with the rotation of the input shaft 41, the magnet 11 and the magnetic yoke 12 rotate integrally with the first coupling portion 14. For that reason, the relative positions of the magnet 11 and the magnetic yoke 12 are fixed.

As described above, in the present embodiment, the magnetic flux generation unit 1 (the magnet 11 and the magnetic yoke 12) has a first pole and a second pole with which a constant magnetic flux (that is, lines of magnetic force) enters and leaves, and rotates in a state in which the relative positions of the first pole and the second pole are fixed as the input shaft 41 rotates. In other words, the magnet 11 and the magnetic yoke 12 rotate integrally with the rotation of the input shaft 41. Further, since the magnet 11 is fixed to the magnetic yoke 12, a path of the magnetic flux passing through the magnetic yoke 12 is not changed in accordance with the rotation of the input shaft 41. In other words, the magnetic flux passing through the magnetic yoke 12 does not increase or decrease with the rotation of the input shaft 41, but is kept constant. One (N pole) of the different magnetic poles of the magnets 11 corresponds to a first pole, and the facing portion 12b disposed in the magnetic yoke 12 and facing each other at a predetermined distance from the N pole corresponds to a second pole.

<Second Coupling portion 15>

As shown in FIG. 2, the second coupling portion 15 is a gear (spur gear) formed in a disc shape and provided with teeth on an outer circumference, and is disposed so as to overlap with the first coupling portion 14 so as to be concentric in the axial direction. The second coupling portion 15 is configured to rotate about a second rotation shaft 17 provided in the second coupling portion 15.

The second rotation shaft 17 is formed so as to extend in the center of the second coupling portion 15 along the axial direction on a side opposite to the first coupling portion 14. The second rotation shaft 17 is rotatably fixed through a bearing (not shown) or the like. The second rotation shaft 17 is provided on the radially outer side of the steering shaft 40 and is parallel to the steering shaft 40. The second rotation shaft 17 is provided coaxially with the first rotation shaft 16.

The second coupling portion 15 is fixed to the outer periphery of the output shaft 43, and is configured to mesh with a second gear 43a that rotates integrally with the output shaft 43. The second rotation shaft 17 is fixed to the second coupling portion 15 so as to be rotatable in conjunction with the rotation of the output shaft 43. For that reason, the second coupling portion 15 is coupled to the output shaft 43 so as to rotate in conjunction with the rotation of the output shaft 43.

A gear ratio of the second coupling portion 15 to the second gear 43a is 1:1. In other words, a ratio of the rotation of the second coupling portion 15 to the rotation of the output shaft 43 is one to one, and when the output shaft 43 rotates, the second coupling portion 15 makes one rotation. That is, the ratio of the rotation of the second coupling portion 15 to the rotation of the output shaft 43 is the same as the ratio of the rotation of the first coupling portion 14 to the rotation of the input shaft 41. For that reason, a torsional displacement between the input shaft 41 and the output shaft 43 is substantially the same as the torsional displacement between the first coupling portion 14 and the second coupling portion 15.

Further, as shown in FIG. 3, a protrusion portion 15a protruding toward the first coupling portion 14 along the axial direction is provided at the center of the second coupling portion 15. A length of the protrusion portion 15a is set so as to project into the accommodating recess portion 14b of the first coupling portion 14 when the first coupling portion 14 and the second coupling portion 15 are assembled together.

The protrusion portion 15a has a cylindrical shape, and is formed so that a center of the protrusion portion 15a coincides with the rotation center. The protrusion portion 15a is disposed between the facing portion 12b of the magnetic yoke 12 and the magnet 11 when the first coupling portion 14 and the second coupling portion 15 are assembled together. In other words, a radius of the protrusion portion 15a is set to be smaller than a distance D2 from the N pole of the magnet 11 to the rotation center of the magnetic yoke 12 (and a distance D3 from the tip of the facing portion 12b to the rotation center of the magnetic yoke 12). A through hole 15b is provided in the protrusion portion 15a along the axial direction. The magnetic sensor 13 is accommodated in the through hole 15b.

<Magnetic Sensor 13>

As shown in FIG. 4, the magnetic sensor 13 utilizes a Hall element or the like, and detects a magnetic flux density passing through the detection surface 13a. More specifically, the magnetic sensor 13 detects the magnetic flux density orthogonal to the detection surface 13a (or an orthogonal component of the magnetic flux density passing through the detection surface 13a). In FIG. 4, the magnetic sensor 13 is connected to a wiring 13b.

The magnetic sensor 13 is fixed in a state of being accommodated in the through hole 15b of the second coupling portion 15. For that reason, when the second coupling portion 15 rotates in conjunction with the rotation of the output shaft 43, the magnetic sensor 13 rotates integrally with the second coupling portion 15 about the second rotation shaft 17 of the second coupling portion 15. In other words, the magnetic sensor 13 is coupled to the output shaft 43 through the second coupling portion 15 so as to rotate in conjunction with the rotation of the output shaft 43.

For that reason, the rotation center of the magnetic sensor 13 coincides with the rotation center (second rotation shaft 17) of the second coupling portion 15, and the rotation center of the magnetic sensor 13 extends along (parallel to) the steering shaft 40 on the radially outer side of the steering shaft 40. Specifically, as shown in FIG. 2, the rotation center of the magnetic sensor 13 is disposed at a position separated from the steering shaft 40 by a predetermined distance D1 radially outward of the steering shaft 40. As described above, the rotation center of the magnetic sensor 13 coincides with the rotation center of the magnetic yoke 12.

The magnetic sensor 13 is disposed between the magnet 11 and the facing portion 12*b* in a state of being accommodated in the through hole 15*b*. More specifically, the magnetic sensor 13 is disposed at the rotation center of the magnetic yoke 12. In other words, the magnetic sensor 13 is disposed at the rotation center of the first coupling portion 14 and the second coupling portion 15. In the axial direction, the magnetic sensor 13 is disposed at a position overlapping with the facing portion 12*b* and the magnet 11. For that reason, the magnetic sensor 13 is disposed at an intermediate point between the N pole of the magnet 11 and the facing portion 12*b* (at a position equidistant from each other).

As shown in FIG. 4, the magnetic sensor 13 is disposed so that the detection surface 13*a* of the magnetic sensor 13 is disposed along (in parallel to) the lines of magnetic force from the N pole toward the facing portion 12*b* in an initial state in which no torsional torque is generated. More specifically, the magnetic sensor 13 is disposed so that the detection surface 13*a* is along (parallel to) a straight line from the N pole of the magnet 11 to the facing portion 12*b*. The straight line from the N pole of the magnet 11 to the facing portion 12*b* indicates a straight line that passes through the rotation center and extends in the radial direction. In FIG. 4, the lines of magnetic force are indicated by an arrow.

As shown in FIG. 4, when the magnetic sensor 13 is viewed from the axial direction, the magnetic sensor 13 is disposed such that the center of the detection surface 13*a* coincides with the center of rotation of the magnetic yoke 12 in the width direction of the magnetic sensor 13 (the radial direction of the magnetic yoke 12). In other words, in the radial direction of the annular portion 12*a*, a distance from the rotation center of the magnetic yoke 12 to an end of the detection surface 13*a* is the same on both the left and right sides. For that reason, a midpoint of the detection surface 13*a* in the width direction coincides with the rotation center of the second coupling portion 15.

When the magnetic sensor 13 rotates together with the second coupling portion 15 with the rotation of the output shaft 43, the detection surface 13*a* also rotates about the second rotation shaft 17. In other words, an angle formed by the detection surface 13*a* and a straight line extending from the N pole of the magnet 11 to the facing portion 12*b* changes according to the torsional displacement between the first coupling portion 14 and the second coupling portion 15. For example, if the torsional displacement between the first coupling portion 14 and the second coupling portion 15 is 90 degrees, a straight line from the N pole of the magnet 11 to the facing portion 12*b* and the detection surface 13*a* are orthogonal to each other. If the torsional displacement between the first coupling portion 14 and the second coupling portion 15 is 45 degrees, the straight line extending from the N pole of the magnet 11 to the facing portion 12*b* and the detection surface 13*a* intersect with each other at an angle of 45 degrees.

The magnetic sensor 13 is surrounded by the protrusion portion 15*a* of the second coupling portion 15. However, the second coupling portion 15 is made of a non-magnetic material (for example, aluminum, or the like) and is configured to allow the lines of magnetic force from the outside to pass through the second coupling portion 15. For that reason, even if the magnetic sensor 13 is surrounded by the protrusion portion 15*a*, the magnetic flux density from the N pole of the magnet 11 to the facing portion 12*b* of the magnetic yoke 12 can be detected.

<Detection Method>

In this example, the detection of the torsional torque by the magnetic sensor 13 will be described. First, a description will be given of a case in which a torsional torque is not applied between the input shaft 41 and the output shaft 43 in an initial state, that is, a case in which the torsion bar 42 is untwisted in a neutral position. In that case, as shown in FIG. 5B, the detection surface 13*a* of the magnetic sensor 13 is disposed in parallel with a straight line from the N pole of the magnet 11 to the facing portion 12*b* at an intermediate point between the N pole of the magnet 11 and the facing portion 12*b*.

At that time, the lines of magnetic force radially generated from the N pole of the magnet 11 are guided to the facing portion 12*b* which is the nearest soft magnetic material, and then pass through the annular portion 12*a* of the magnetic yoke 12 to be guided to the S pole of the magnet 11 connected to the annular portion 12*a*. For that reason, the lines of magnetic force are parallel to the detection surface 13*a* of the magnetic sensor 13, and hardly pass through the detection surface 13*a*. Therefore, the magnetic flux density detected by the magnetic sensor 13 is zero (or a value close to zero as far as possible).

When a torsional torque is applied between the input shaft 41 and the output shaft 43 and a torsional displacement (torsion angle) occurs in the torsion bar 42, the first coupling portion 14 and the second coupling portion 15 also rotate in conjunction with the input shaft 41 and the output shaft 43, respectively. Since the speed reduction ratio is 1:1, the same torsional displacement as the torsional displacement generated in the torsion bar 42 occurs between the first coupling portion 14 and the second coupling portion 15. The detection surface 13*a* of the magnetic sensor 13 rotates in accordance with the torsional displacement with respect to the magnetic yoke 12 and the magnet 11. On the other hand, since the magnetic yoke 12 and the magnet 11 rotate integrally, relative positions of the magnetic yoke 12 and the magnet 11 are fixed.

Figure 5A:
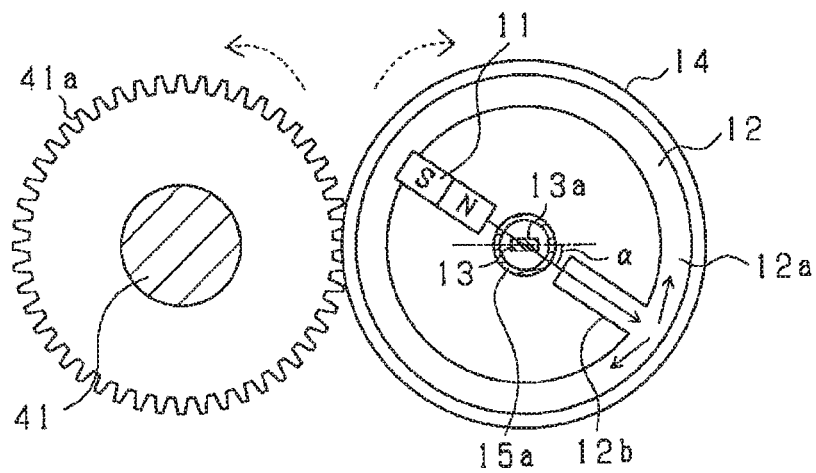
FIG. 5A is a schematic diagram showing a positional relationship between a magnetic yoke and a magnetic sensor.
Figure 5B:
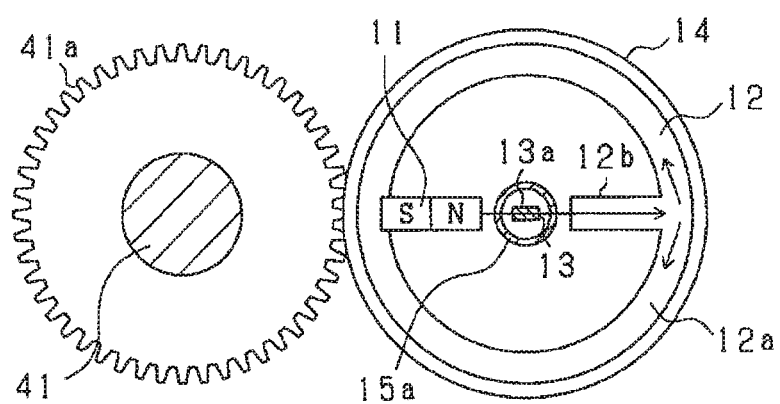
FIG. 5B is a schematic diagram showing the positional relationship between the magnetic yoke and the magnetic sensor.
Figure 5C:
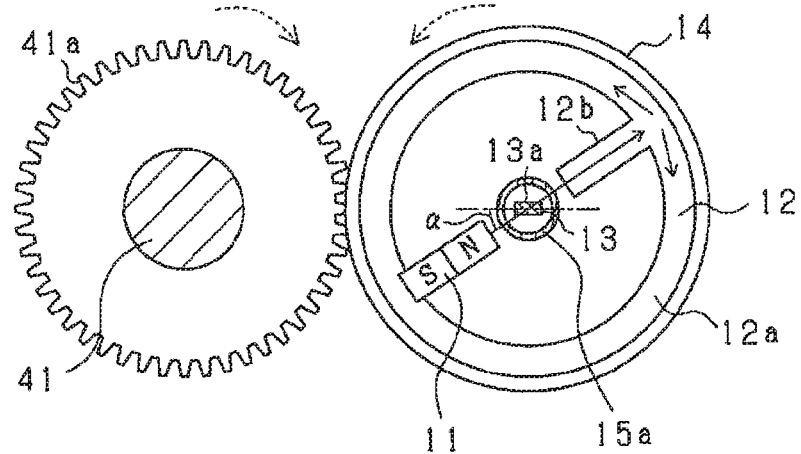
FIG. 5C is a schematic diagram showing the positional relationship between the magnetic yoke and the magnetic sensor.

For that reason, as shown in FIG. 5A or 5C, an angle α formed by a straight line extending from the N pole of the magnet 11 to the facing portion 12*b* and the detection surface 13*a* changes in accordance with the torsional displacement. In other words, the magnetic flux density induced from the N pole of the magnet 11 to the facing portion 12*b* has an incident angle passing through the detection surface 13*a* at an angle corresponding to the torsional displacement.

The magnetic sensor 13 detects an orthogonal component of the magnetic flux density that has passed through the detection surface 13*a*. The magnetic flux density is guided from the N pole of the magnet 11 to the facing portion 12*b*. For that reason, when the angle α formed by the straight line extending from the N pole of the magnet 11 to the facing portion 12*b* and the detection surface 13*a* changes in accordance with the torsional displacement, the orthogonal component of the magnetic flux density passing through the detection surface 13*a* also changes in accordance with the torsional displacement.

Figure 6:
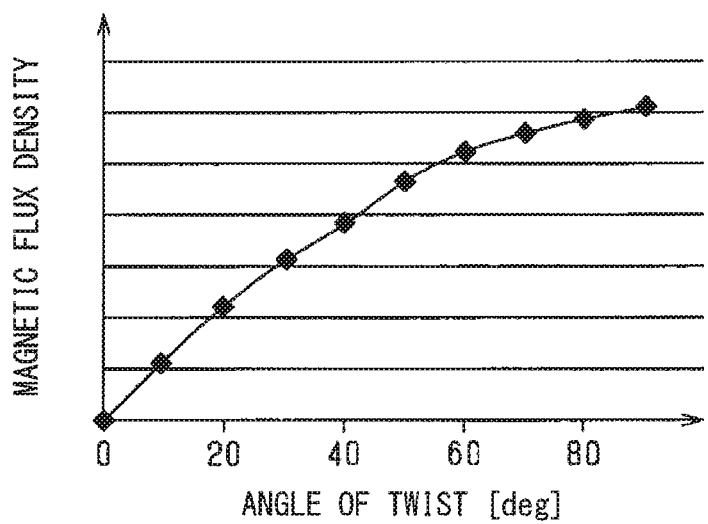
FIG. 6 is a diagram showing a relationship between a magnetic flux density and an angle.

Therefore, the detected magnetic flux density changes in accordance with the torsional displacement (torsion angle) as shown in FIG. 6. When the rotation direction is reversed, the same is applied except that the direction (polarity) of the magnetic flux density is only reversed.

As described above, when the magnetic sensor 13 rotates with respect to the magnet 11 and the magnetic yoke 12, the magnetic flux density corresponding to the torsional displacement is detected. The magnetic flux density detected by the magnetic sensor 13 is substantially proportional to the torsional displacement amount of the torsion bar 42, and the polarity is reversed in accordance with the torsional direction of the torsion bar 42. A voltage of the voltage signal depends on the magnetic flux density, that is, the torsional displacement amount. Since the torsional torque is proportional to the torsional displacement amount, the voltage of the voltage signal also corresponds to the torsional torque. Therefore, the torque detector 10 can output a voltage signal corresponding to the torsional torque.

When a material of the magnetic yoke 12 is changed, a magnetic hysteresis may be different. If the magnetic hysteresis is different, the magnetic flux density from the magnet 11 to the facing portion 12b changes if the other configurations (the magnet 11, the magnetic yoke 12, and so on) are the same. For example, when the material of the magnetic yoke 12 is changed to a material having a large magnetic hysteresis, the magnetic flux density from the magnet 11 to the facing portion 12b decreases.

However, in the torque detector 10 according to the present embodiment, on the assumption that the magnetic flux density from the magnet 11 to the facing portion 12b is kept constant regardless of the torsional displacement, the detected magnetic flux density is changed based on the angle α of the detection surface 13a with respect to the magnetic yoke 12 or the like. In other words, even if torsional torque is generated, the magnetic flux density from the magnet 11 (first pole) to the facing portion 12b (second pole) is kept constant without any change. On the other hand, as described above, since an incident angle changes, the magnetic flux density detected by the magnetic sensor 13 changes in accordance with the torsional torque. For that reason, the magnetic flux density per se passing through the magnetic yoke 12 is less likely to be affected by the magnetic hysteresis of the magnetic yoke 12 as compared with the case where the magnetic flux density per se is changed in accordance with the torsional displacement.

The configuration described above obtains the following effects.

According to the configuration described above, even if the output shaft 43 rotates relative to the input shaft 41, the relative positions of the N pole (first pole) of the magnet 11 and the facing portion 12b (second pole) of the magnetic yoke 12 are fixed. The relative positions of the magnetic yoke 12 and the magnet 11 are also fixed. For that reason, the magnetic flux density from the N pole to the facing portion 12b does not change according to the torsional displacement (is kept constant). In other words, even if the output shaft 43 rotates relative to the input shaft 41, the path through which the magnetic flux passes is always the same and is not affected by the magnetic hysteresis. On the other hand, the angle α (incident angle) formed by the straight line from the N pole to the facing portion 12b and the detection surface 13a of the magnetic sensor 13 changes in accordance with the rotation of the output shaft 43 with respect to the input shaft 41. The number of lines of magnetic force passing through the detection surface 13a changes in accordance with a change in the angle α. In other words, the magnetic flux density changes. The torque detector 10 can detect the torsional displacement based on the change in the magnetic flux density.

The change rate of the magnetic flux density depends on the change in the angle α of the detection surface 13a with respect to the magnetic yoke 12 or the like. At this time, it is assumed that the magnetic flux density passing through the magnetic yoke 12 is kept constant regardless of the torsional displacement amount. In other words, the magnetic flux density received by the magnetic sensor 13 is not affected by the magnetic hysteresis, and when the torsional torque is the same, the magnetic flux density detected by the magnetic sensor 13 does not vary. For that reason, even if the magnetic hysteresis of the magnetic yoke 12 is changed, the detection accuracy of the torsional torque can be inhibited from being lowered.

As shown in FIG. 6, the magnetic flux density detected by the magnetic sensor 13 is more likely to change as the lines of magnetic force and the detection surface 13a are closer to parallel to each other, and is also more likely to change constantly. Therefore, the magnetic sensor 13 is disposed so that the detection surface 13a of the magnetic sensor 13 is placed along the lines of magnetic forces in the initial state. In other words, in the initial state, the detection surface 13a is placed along a straight line extending from the N pole to the facing portion 12b. According to the above configuration, the change in the magnetic flux density detected by the magnetic sensor 13 can be increased, and the magnetic flux density can be changed constantly. For that reason, the torsional torque can be detected with high accuracy.

Further, when the detection surface 13a is placed as described above, the magnetic flux density changes symmetrically when the rotation direction is different. In other words, only the polarities are different, and the magnetic flux density is changed in the same manner. This makes it possible to reduce the labor required for calculating the torsional torque based on the torsional displacement.

The magnet 11 is placed inside the magnetic yoke 12, and the S pole of the different poles of the magnet 11 is placed to face the magnetic yoke 12 on a side of the magnet 11 that faces away from the rotation center of the magnetic yoke 12. This makes it possible to induce the lines of magnetic force from the N pole to the S pole by the magnetic yoke 12, and it possible to increase the magnetic flux density from the N pole to the facing portion 12b. If the magnetic flux density is increased, the influence of external noise can be inhibited. In addition, a change in the magnetic flux density based on a change in the rotation angle can also be easily detected. Therefore, the deterioration of the detection accuracy of the torsional torque can be further reduced.

The S pole is fixed so as to be connected to the magnetic yoke 12. As a result, an air gap between the magnetic yoke 12 and the magnet 11 can be reduced as much as possible, and the magnetic flux density from the N pole to the facing portion 12b can be increased. If the magnetic flux density is increased, the influence of external noise can be inhibited. In addition, a change in the magnetic flux density based on a change in the rotation angle can also be easily detected. Therefore, the deterioration of the detection accuracy of the torsional torque can be further reduced.

The facing portion 12b protrudes from the inner edge of the annular portion 12a of the magnetic yoke 12 toward the N pole. A distance from the N pole to the inner edge of the annular portion 12a is set to be longer than the distance D4 to the facing portion 12b. As a result, the lines of magnetic force passing through the magnetic yoke 12 can be collected in the facing portion 12b, and the magnetic flux density from the N pole to the facing portion 12b can be increased. If the magnetic flux density is increased, the influence of external noise can be inhibited. In addition, a change in the magnetic flux density can be easily detected. Therefore, the deterioration of the detection accuracy of the torsional torque can be further reduced.

The first rotation shaft 16 of the magnetic yoke 12 is disposed on the radially outer side of the steering shaft 40 and parallel to the steering shaft 40, and the magnetic sensor 13 is disposed at the rotation center of the magnetic yoke 12. With the placement of the rotation center of the magnetic yoke 12 on the radially outer side of the steering shaft 40, the magnetic sensor 13 can be placed at a position where the magnetic flux density can be suitably detected, that is, at the rotation center of the magnetic yoke 12 without being disturbed by the torsion bar 42 connecting the input shaft 41 and the output shaft 43.

The magnetic yoke 12 and the magnet 11 are coupled to the input shaft 41 through the first coupling portion 14 in a state of being rotated in accordance with the rotation of the input shaft 41. The magnetic sensor 13 is connected to the output shaft 43 through the second coupling portion 15 in a state of being rotated in accordance with the rotation of the output shaft 43. The ratio of the rotation of the magnetic yoke 12 to the rotation of the input shaft 41 is the same as the ratio of the rotation of the magnetic sensor 13 to the rotation of the output shaft 43. In other words, a gear ratio (speed reduction ratio) of the first coupling portion 14 to the first gear 41a of the input shaft 41 and a gear ratio of the second coupling portion 15 to the second gear 43a of the output shaft 43 are set to be the same as each other. In this manner, the ratio of rotation is set to be the same, so that the torsional displacement between the magnetic yoke 12 (and the magnet 11) and the magnetic sensor 13 can correspond to the torsional displacement between the input shaft 41 and the output shaft 43. For that reason, the torsional torque can be easily calculated based on a change in the magnetic flux density detected by the magnetic sensor 13. In addition, an error is reduced.

In the configuration described above, the air gap between the magnetic yoke 12 and the magnet 11 is provided at only one position between the N pole and the facing portion 12b. For that reason, in the configuration described above, a magnetoresistance in a magnetic circuit can be reduced in the air gap as compared with the torque detector using a magnetism collection ring or the like. For that reason, there is no need to use a large magnet or a magnet having a large residual magnetic flux density as the magnet 11. In addition, since the magnetic flux density can be improved, there is no need to employ the magnetism collection ring, and the number of components can be reduced. In addition, since the lines of magnetic force from the N pole of the magnet 11 toward the magnetic yoke 12 are used, there is no need to provide a magnetic yoke for each polarity. Therefore, the torque detector 10 can be reduced in size and the manufacturing cost can be reduced.

In the conventional torque detector in which the ring magnet is provided around the rotation shaft and the magnetic yoke is provided outside the ring magnet, the diameter of the rotation shaft may increase the size of the ring magnet and the magnetic yoke. When a ring magnet is employed, the magnetic flux density increases or decreases depending on the area of the magnetic pole. Therefore, the magnetic yoke and the ring magnet are required to have a certain size in consideration of the detection accuracy. On the other hand, in the torque detector 10 having the configuration described above, even if the diameter of the rotation shaft increases, an increase in size of the torque detector 10 can be reduced by shortening the length of the magnet 11 and the facing portion 12b in the radial direction. At this time, since the area of the facing portion does not change, a decrease in detection accuracy can be reduced.

Second Embodiment

In a second embodiment, unlike the first embodiment, the first coupling portion 14 and the second coupling portion 15 are not used. In the second embodiment, a magnetic yoke 12 and a magnet 11 are connected to an input shaft 41 so as to rotate integrally, and a magnetic sensor 13 is connected to an output shaft 43 so as to rotate integrally. Hereinafter, the second embodiment will be described in detail.

<Magnetic Yoke 12>

Figure 7:
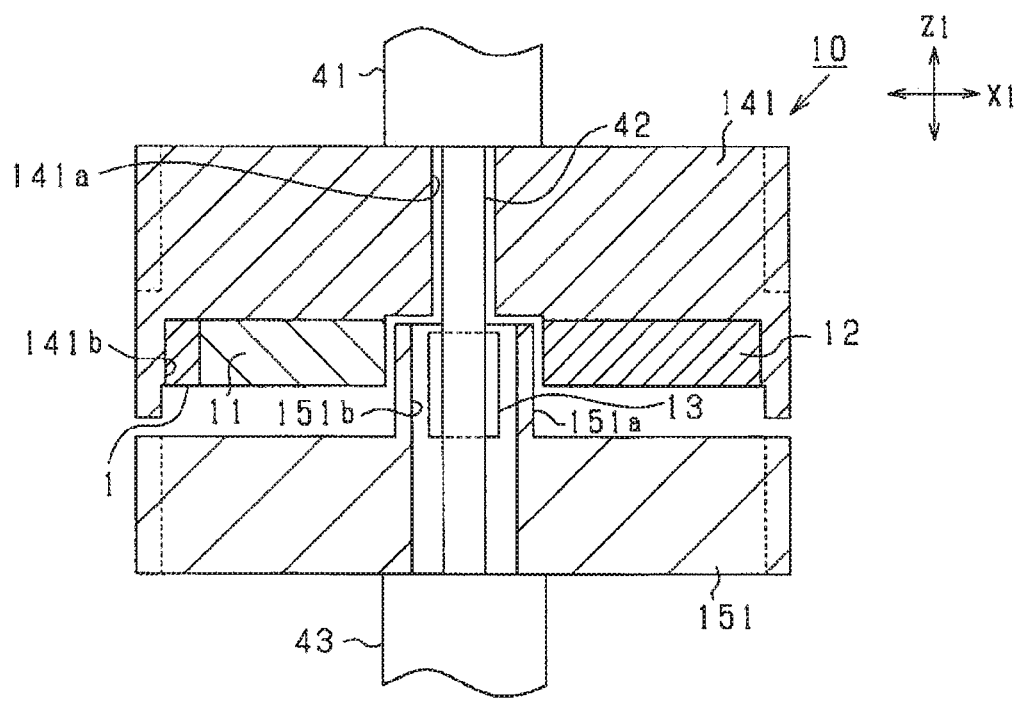
FIG. 7 is a vertical cross-sectional view of the torque detector according to at least one embodiment.

As shown in FIG. 7, the magnetic yoke 12 according to the second embodiment is fixed to the input shaft 41 through a fixing member 141 or the like. At this time, the magnetic yoke 12 (annular portion 12a) is fixed to the input shaft 41 through a fixing member 141 or the like so that a center of the magnetic yoke 12 (annular portion 12a) coincides with an axial center of the input shaft 41. For that reason, the magnetic yoke 12 rotates about the input shaft 41 in conjunction with the rotation of the input shaft 41. In other words, the magnetic yoke 12 is coupled to the input shaft 41 so as to rotate in conjunction with the rotation of the input shaft 41. Therefore, the rotation center of the magnetic yoke 12 is coaxial with the input shaft 41.

A through hole 141a is provided in the fixing member 141, and the torsion bar 42 is inserted through the through hole 141a. The magnetic yoke 12 is accommodated and fixed in the accommodating recess portion 141b of the fixing member 141.

<Magnet 11>

The magnet 11 according to the second embodiment is fixed to the magnetic yoke 12 similarly to the first embodiment. In other words, the magnet 11 and the magnetic yoke 12 rotate integrally in conjunction with the rotation of the input shaft 41. For that reason, the relative positions of the magnet 11 and the magnetic yoke 12 are fixed.

<Magnetic Sensor 13>

As shown in FIG. 7, the magnetic sensor 13 of the second embodiment is fixed to the output shaft 43 through a fixing member 151 or the like. Specifically, the magnetic sensor 13 is accommodated in and fixed to a through hole 151b provided in a protrusion portion 151a of the fixing member 151. For that reason, when the output shaft 43 rotates, the magnetic sensor 13 rotates integrally with the output shaft 43 about the output shaft 43. In other words, the magnetic sensor 13 is coupled to the output shaft 43 so as to rotate in conjunction with the rotation of the output shaft 43.

For that reason, the rotation center of the magnetic sensor 13 coincides with the axis center of the output shaft 43. Since the input shaft 41 and the output shaft 43 are coaxial with each other, the rotation center of the magnetic sensor 13 coincides with the rotation center of the magnetic yoke 12.

Figure 8A:
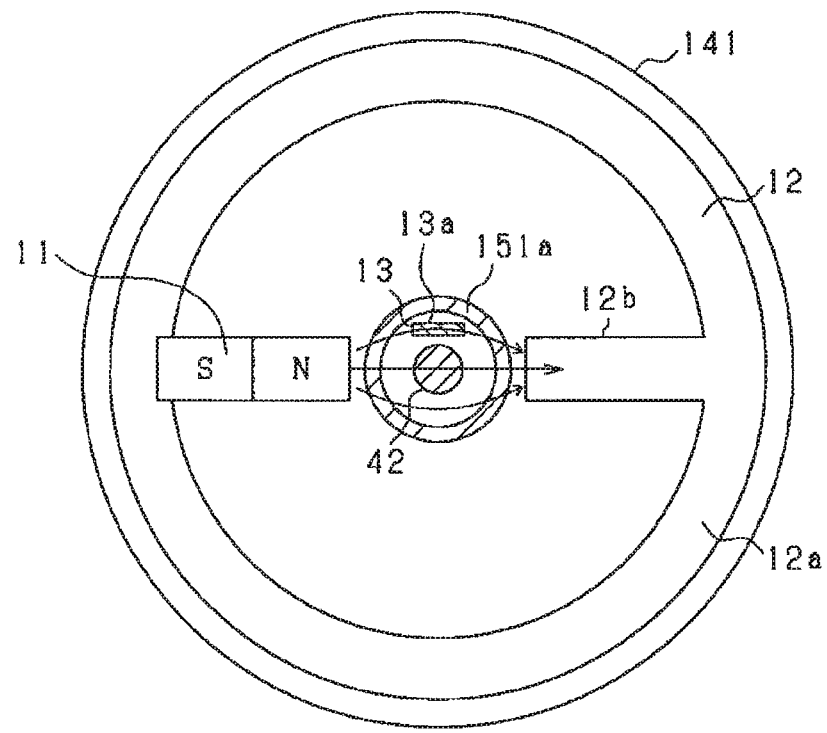
FIG. 8A is a schematic diagram showing the positional relationship between the magnetic yoke and the magnetic sensor.
Figure 8B:
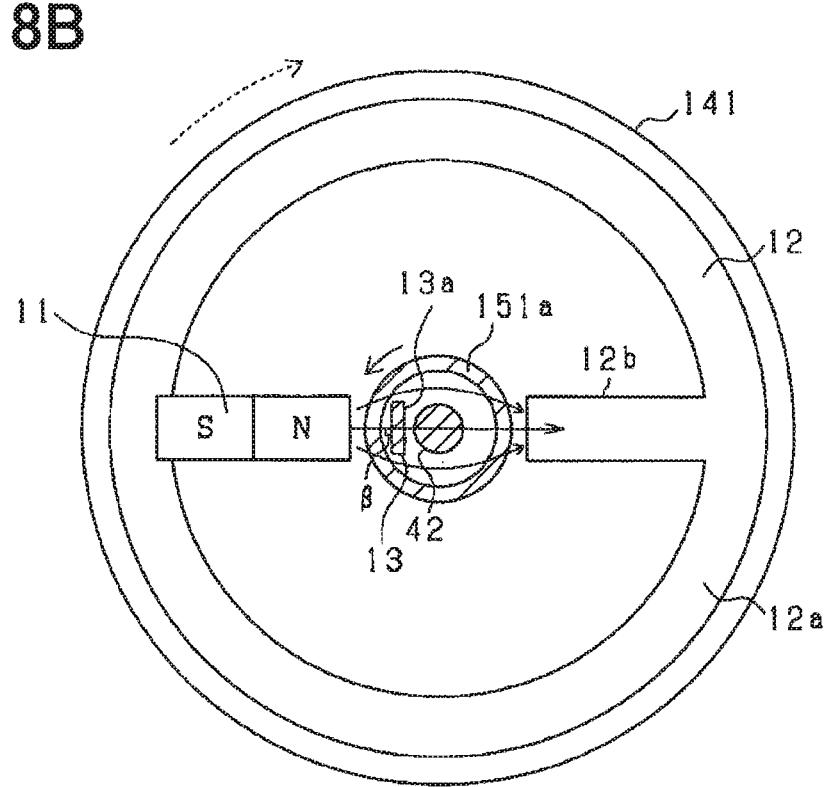
FIG. 8B is a schematic diagram showing the positional relationship between the magnetic yoke and the magnetic sensor.

As shown in FIGS. 8A and 8B, the magnetic sensor 13 is disposed between the magnet 11 and the facing portion 12b. More specifically, the magnetic sensor 13 is disposed at a position in the radially inner side of the annular portion 12a with respect to the magnet 11 and the facing portion 12b, and at a position outside the outer periphery of the torsion bar 42.

The magnetic sensor 13 is disposed at a position where the distance from the magnetic sensor 13 to the N pole and the distance from the magnetic sensor 13 to the facing portion 12b are equal to each other in an initial state in which the torsional torque is not generated. More specifically, when the magnetic yoke 12 and the magnetic sensor 13 are viewed from the input shaft 41 side in the axial direction, the magnetic sensor 13 is disposed on a straight line orthogonal to the straight line from the N pole to the facing portion 12b and at a position separated from the rotation center (the axis center of the steering shaft 40) by a predetermined distance upward in FIG. 8A.

The magnetic sensor 13 is disposed so that the detection surface 13a of the magnetic sensor 13 is along (parallel to)

the lines of magnetic force from the N pole toward the facing portion 12b in the initial state in which the torsional torque is not generated. In FIGS. 8A and 8B, the lines of magnetic force are indicated by arrows. Specifically, the magnetic sensor 13 is disposed so that the detection surface 13a extends along (parallel to) a straight line from the N pole of the magnet 11 to the facing portion 12b. In the second embodiment, the lines of magnetic force generated from the N pole radiate and thereafter converge toward the facing portion 12b. For that reason, at a position where the distance from the magnetic sensor 13 to the N pole and the distance from the facing portion 12b are equal to each other, the direction of the lines of magnetic force is along (parallel to) a straight line from the N pole of the magnet 11 to the facing portion 12b.

Further, as shown in FIGS. 8A and 8B, when the magnetic sensor 13 is viewed from the axial direction, a midpoint of the detection surface 13a in the width direction is disposed at a position where the distance from the magnetic sensor 13 to the N pole and the distance from the magnetic sensor 13 to the facing portion 12b are equal to each other.

When the output shaft 43 rotates, the magnetic sensor 13 also rotates around the torsion bar 42. At this time, the detection surface 13a rotates around the torsion bar 42 in a state facing the torsion bar 42 so as to be always perpendicular to the radial direction of the torsion bar 42. For that reason, an angle β formed by the detection surface 13a and the lines of magnetic force from the N pole of the magnet 11 to the facing portion 12b changes in accordance with the torsional displacement between the input shaft 41 and the output shaft 43.

<Detection Method>

Detection of the torsional torque by the magnetic sensor 13 according to the second embodiment will be described. First, a description will be given of the initial state in which no torsional torque is applied between the input shaft 41 and the output shaft 43. In this case, as shown in FIG. 8A, the detection surface 13a of the magnetic sensor 13 is disposed so as to be parallel to a straight line from the N pole of the magnet 11 to the facing portion 12b at the intermediate point between the N pole of the magnet 11 and the facing portion 12b.

At that time, the lines of magnetic force radially generated from the N pole of the magnet 11 are guided to the facing portion 12b which is the nearest soft magnetic material, and then pass through the annular portion 12a of the magnetic yoke 12 to be guided to the S pole of the magnet 11 connected to the annular portion 12a. For that reason, the lines of magnetic force are parallel to the detection surface 13a of the magnetic sensor 13, and hardly pass through the detection surface 13a. Therefore, the magnetic flux density detected by the magnetic sensor 13 is zero (or a value close to zero as far as possible).

When a torsional torque is applied between the input shaft 41 and the output shaft 43 to cause a torsional displacement in the torsion bar 42, the magnetic sensor 13 rotates relative to the magnetic yoke 12 (and the magnet 11) in accordance with the torsional displacement.

For that reason, as shown in FIG. 8B, the angle β formed by the straight line from the N pole of the magnet 11 to the facing portion 12b and the detection surface 13a changes in accordance with the torsional displacement. In other words, the magnetic flux density induced from the N pole of the magnet 11 to the facing portion 12b has the angle β corresponding to the torsional displacement of the incident angle passing through the detection surface 13a. For that reason, similarly to the first embodiment, the detection surface 13a of the magnetic sensor 13 relatively rotates in accordance with the torsional displacement, and the orthogonal component of the magnetic flux density passing through the detection surface 13a also changes in accordance with the rotation of the detection surface 13a.

Therefore, the detected magnetic flux density also changes in accordance with the torsional displacement. When the rotation direction is reversed, the same is applied except that the direction (polarity) of the magnetic flux density is only reversed.

According to the second embodiment, the following effects can be obtained.

The center of rotation of the magnetic yoke 12 is coaxial with the input shaft 41 and the output shaft 43, and the magnetic sensor 13 is disposed outside the torsion bar 42 in the radial direction of the input shaft 41 and the output shaft 43. This makes it possible to downsize the torque detector 10 as compared with the case where the magnetic yoke 12, the magnet 11, and the magnetic sensor 13 are disposed on the radially outer side of the steering shaft 40 as in the first embodiment.

Third Embodiment

In a third embodiment, in addition to the configuration of the first embodiment, an angular sensor 101 for detecting a rotation angle of an input shaft 41 is provided. An angular sensor 101 is coupled to the input shaft 41 through a third coupling portion 102 serving as an angular sensor coupling portion. Hereinafter, the second embodiment will be described in detail.

<First Coupling Portion 14>

Figure 9:
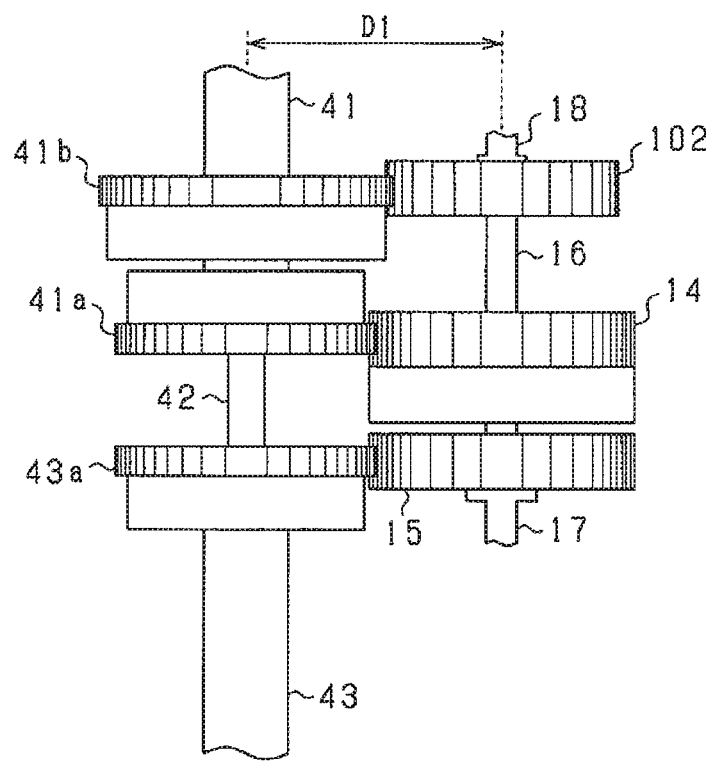
FIG. 9 is a side view showing the torque detector according to at least one embodiment.
Figure 10:
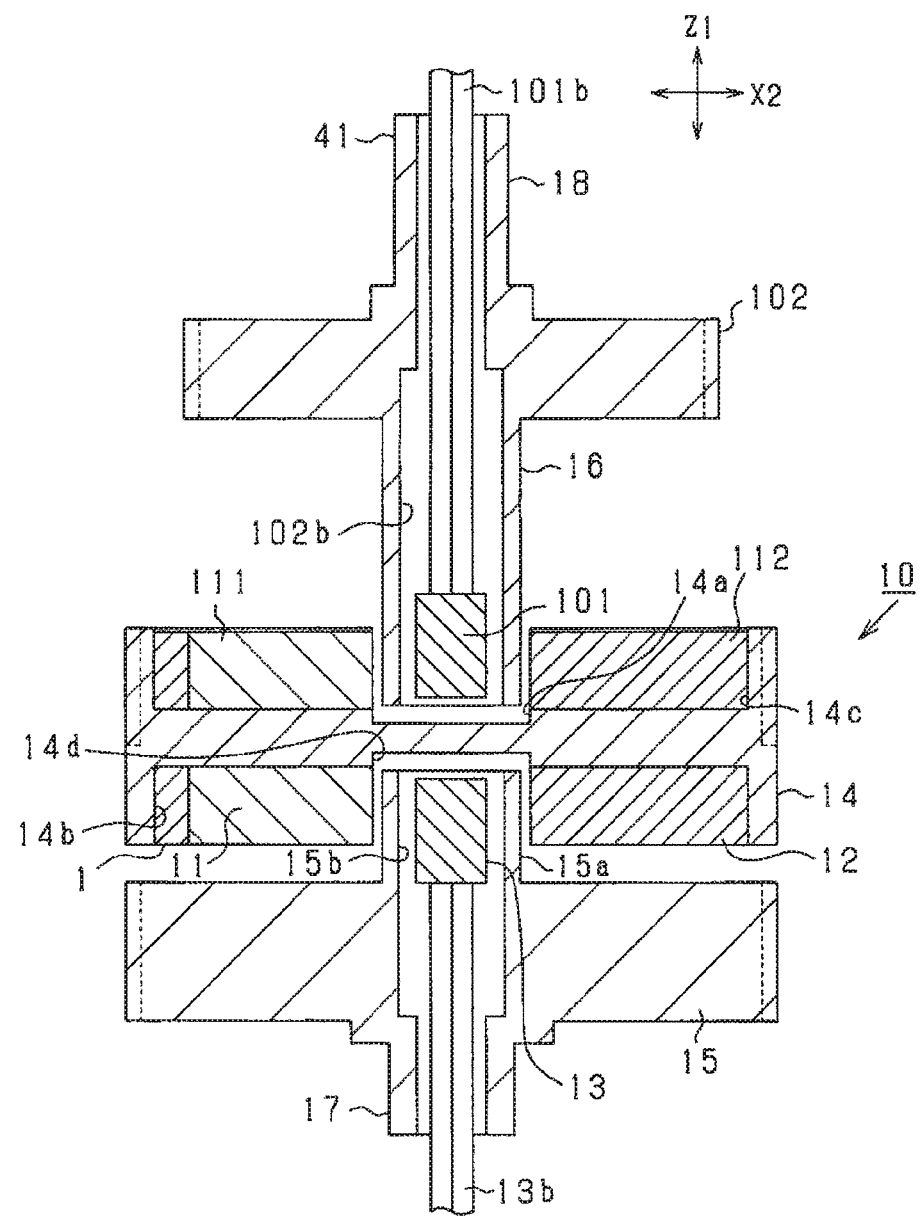
FIG. 10 is a vertical cross-sectional view showing the torque detector according to at least one embodiment.

As shown in FIGS. 9 and 10, in a first coupling portion 14 of the third embodiment, an accommodating recess portion is provided along an axial direction also on an opposite side to a surface facing the second coupling portion 15. Hereinafter, in the third embodiment, the accommodating recess portion provided on the side facing the second coupling portion 15 is referred to as a first accommodating recess portion 14b, and the accommodating recess portion provided on the opposite side is referred to as a second accommodating recess portion 14c. The magnetic yoke 112 and the magnet 111 are accommodated and fixed in the second accommodating recess portion 14c. Since the magnetic yoke 112 and the magnet 111 accommodated in the second accommodating recess portion 14c are the same as those of the magnetic yoke 12 and the magnet 11 of the first embodiment, the magnetic yoke 112 and the magnet 111 are denoted by the same reference numerals as those of the first embodiment, and a detailed description of those components will be omitted.

<Third Coupling portion 102>

The third coupling portion 102 is a gear (spur gear) formed in a disc shape and provided with teeth on an outer circumference of the third coupling portion 102, and is disposed so as to overlap concentrically with the first coupling portion 14 in the axial direction. In this case, the third coupling portion 102 is disposed on a side of the first coupling portion 14 opposite to the second coupling portion 15.

The third coupling portion 102 is configured to rotate about a third rotation shaft 18 provided on the third coupling portion 102. The third rotation shaft 18 is formed so as to extend in the center of the third coupling portion 102 along the axial direction on the side opposite to the first coupling portion 14. The third rotation shaft 18 is rotatably fixed through a bearing (not shown) or the like. The third rotation shaft 18 is provided on the radially outer side of the steering shaft 40, and is parallel to the steering shaft 40. The third rotation shaft 18 is provided coaxially with the first rotation shaft 16 and the second rotation shaft 17.

The third coupling portion 102 is configured to mesh with a third gear 41b fixed to the outer periphery of the input shaft 41 so as to rotate integrally with the input shaft 41. The third rotation shaft 18 is fixed to the third coupling portion 102 so as to be rotatable in conjunction with the rotation of the input shaft 41. For that reason, the third coupling portion 102 is coupled to the input shaft 41 so as to rotate in conjunction with the rotation of the input shaft 41.

A gear ratio of the third coupling portion 102 to the third gear 41b is 60 to 40. In other words, a ratio of the rotation of the third coupling portion 102 to the rotation of the input shaft 41 is 2:3, and when the input shaft 41 makes two rotations, the third coupling portion 102 makes three rotations. In other words, a ratio of the rotation of the third coupling portion 102 to the rotation of the input shaft 41 is different from the ratio of the rotation of the first coupling portion 14 to the rotation of the input shaft 41.

As shown in FIG. 10, the first rotation shaft 16 protruding toward the first coupling portion 14 along the axial direction is provided at the center of the third coupling portion 102. The first rotation shaft 16 is configured to be insertable into a shaft hole 14a provided in a bottom portion of the second accommodating recess portion 14c of the first coupling portion 14.

The shaft hole 14d is also provided at the bottom portion of the first accommodating recess portion 14b, and the protrusion portion 15a of the second coupling portion 15 is configured to be insertable. The first coupling portion 14 is restrained from moving in the axial direction by the first rotation shaft 16 and the protrusion portion 15a. The first coupling portion 14 is rotatably fixed by the first rotation shaft 16 and the protrusion portion 15a.

The first rotation shaft 16 provided in the third coupling portion 102 is provided with a through hole 102b along the axial direction. The angular sensor 101 is accommodated and fixed in the through hole 102b.

<Angular Sensor 101>

The angular sensor 101 uses a Hall element or the like, and detects a magnetic flux density (or magnetic flux) passing through the detection surface 101a. More specifically, the angular sensor 101 detects a magnetic flux density orthogonal to the detection surface 101a (or an orthogonal component of the magnetic flux density passing through the detection surface 101a). In FIG. 10, a wiring 101b is connected to the angular sensor 101.

The angular sensor 101 is fixed in a state of being accommodated in the through hole 102b of the third coupling portion 102. For that reason, when the third coupling portion 102 rotates in conjunction with the rotation of the input shaft 41, the angular sensor 101 rotates integrally with the third coupling portion 102 about the third rotation shaft 18. In other words, the angular sensor 101 is coupled to the input shaft 41 through the third coupling portion 102 so as to rotate in conjunction with the rotation of the input shaft 41.

For that reason, the center of rotation of the angular sensor 101 coincides with the center of rotation of the third coupling portion 102, and the center of rotation of the angular sensor 101 is parallel to the steering shaft 40 on the radially outer side of the steering shaft 40. Specifically, as shown in FIG. 9, the rotation center of the angular sensor 101 is disposed at a position separated from the steering shaft 40 by a predetermined distance D1 radially outward of the steering shaft 40. As described above, the rotation center of the angular sensor 101 coincides with the rotation center of the magnetic yoke 112.

The angular sensor 101 is disposed between the magnet 111 and a facing portion 12b of the magnetic yoke 112 in a state of being accommodated in the through hole 102b. More specifically, the angular sensor 101 is disposed at the rotation center of the magnetic yoke 112. In other words, the angular sensor 101 is disposed at the rotation center of the third coupling portion 102. In the axial direction, the angular sensor 101 is disposed at a position overlapping with the facing portion 12b of the magnetic yoke 112 and the magnet 111. For that reason, the angular sensor 101 is disposed at an intermediate point (distantly equidistant position) between the N pole of the magnet 111 and the facing portion 12b of the magnetic yoke 112.

Figure 11A:
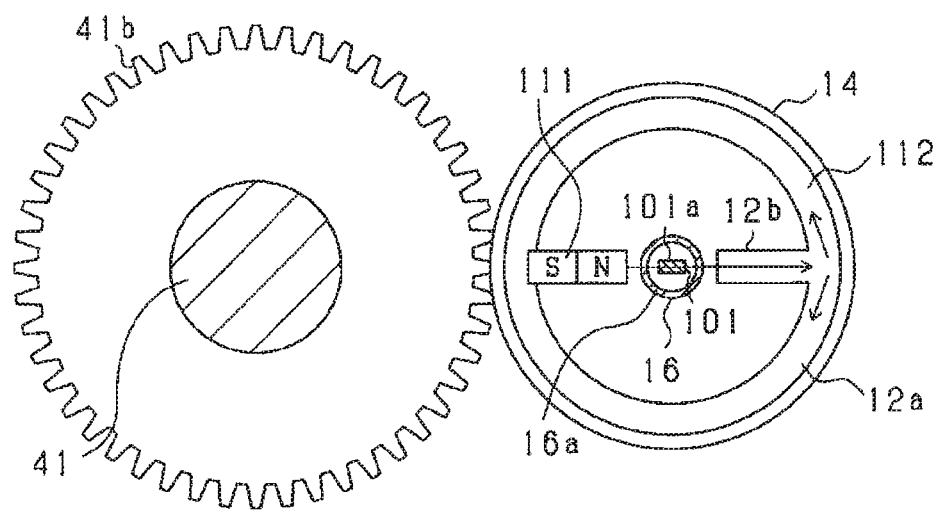
FIG. 11A is a schematic diagram showing the positional relationship between the magnetic yoke and the magnetic sensor.

As shown in FIG. 11A, the angular sensor 101 is disposed such that the detection surface 101a of the angular sensor 101 is parallel to the lines of magnetic force from the N pole toward the facing portion 12b of the magnetic yoke 112 in an initial state in which the torsional torque is not generated. Specifically, the angular sensor 101 is disposed so that a straight line extending from the N pole of the magnet 111 to the facing portion 12b of the magnetic yoke 112 is parallel to the detection surface 101a. A straight line extending from the N pole of the magnet 111 to the facing portion 12b of the magnetic yoke 112 is a straight line that passes through the center of rotation and extends in the radial direction.

Figure 11B:
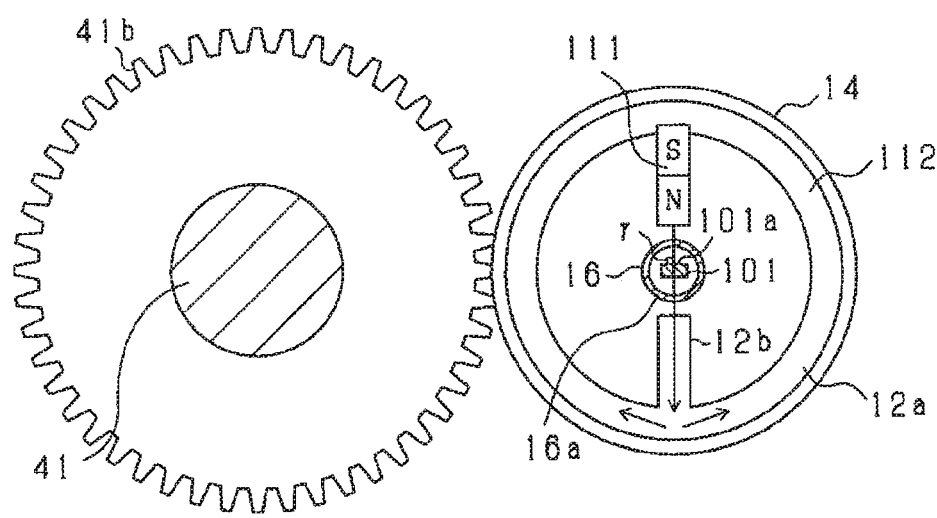
FIG. 11B is a schematic diagram showing the positional relationship between the magnetic yoke and the magnetic sensor.

In FIGS. 11A, 11B, and 11C, the lines of magnetic force are indicated by arrows. FIGS. 11A, 11B, and 11C are diagrams of the magnetic yoke 12 when being viewed from the input shaft 41.

When the angular sensor 101 is viewed from the axial direction, the angular sensor 101 is disposed such that the center of the detection surface 101a coincides with the center of rotation of the magnetic yoke 112 in the width direction of the angular sensor 101 (in the radial direction of the magnetic yoke 112). When the angular sensor 101 rotates together with the third coupling portion 102 along with the rotation of the input shaft 41, the detection surface 101a of the angular sensor 101 also rotates about the third rotation shaft 18. The third coupling portion 102 is made of a non-magnetic material (for example, aluminum) and is configured to allow the lines of magnetic force from the outside to pass through the third coupling portion 102.

<Detection Method>

In this example, detection of the rotation angle of the input shaft 41 by the angular sensor 101 will be described. First, a case in which the input shaft 41 is not rotated will be described. In that case, as shown in FIG. 11A, the detection surface 101a of the angular sensor 101 is disposed so as to be parallel to a straight line extending from the N pole of the magnet 111 to the facing portion 12b at an intermediate point between the N pole of the magnet 111 and the facing portion 12b of the magnetic yoke 112. Therefore, the magnetic flux density detected by the angular sensor 101 is zero (or a value close to zero as far as possible).

When the input shaft 41 is rotated, the first coupling portion 14 and the third coupling portion 102 also rotate in conjunction with the input shaft 41. However, since the speed reduction ratio is different, a torsional displacement occurs between the first coupling portion 14 and the third coupling portion 102 in accordance with the rotation angle of the input shaft 41. When the torsional displacement occurs, the detection surface 101a of the angular sensor 101 rotates relative to the magnetic yoke 112 or the like in accordance with the torsional displacement between the first coupling portion 14 and the third coupling portion 102.

For that reason, as shown in FIG. 11B, an angle γ formed by the detection surface 101a and a straight line extending from the N pole of the magnet 111 to the facing portion 12b of the magnetic yoke 112 changes in accordance with the torsional displacement between the first coupling portion 14 and the third coupling portion 102.

Therefore, the magnetic flux density detected by the angular sensor 101 changes in accordance with the torsional displacement generated in accordance with the rotation angle of the input shaft 41. When the rotation direction is reversed, the same is applied except that the direction (polarity) of the magnetic flux density is only reversed. For that reason, the rotation angle of the input shaft 41 can be detected based on the difference between the magnetic flux density and the speed reduction ratio detected by the angular sensor 101. The rotation angle of the output shaft 43 can be calculated based on the torsional displacement of the torsion bar 42.

The configuration described above obtains the following effects.

As a result, with the provision of the angular sensor 101, the torsional torque can be detected and the rotation angle of the input shaft 41 can be detected. In this case, the first coupling portion 14 can be used.

Fourth Embodiment

In a fourth embodiment, in addition to the configuration of the first embodiment, an angular sensor 201 for detecting a rotation angle of an output shaft 43 is provided. The angular sensor 201 is connected to the output shaft 43 through a fourth coupling portion 202 serving as an angular sensor coupling portion. Hereinafter, a detailed description will be given of the fourth embodiment with reference to FIGS. 12A and 12B.

<Second Coupling portion 15>

Figure 12A:
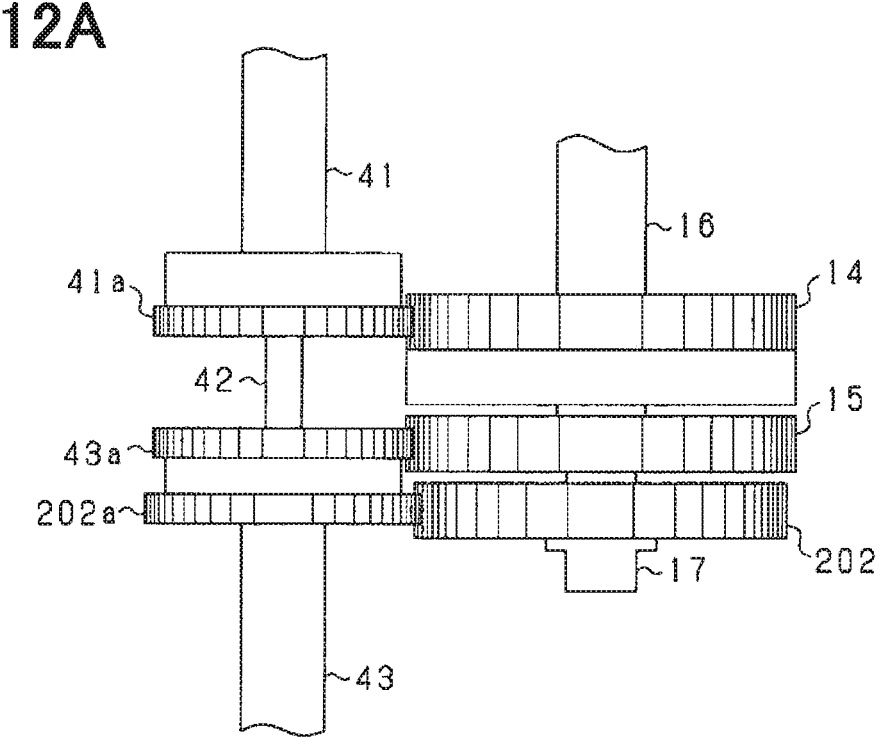
FIG. 12A is a side view showing the torque detector according to at least one embodiment.
Figure 12B:
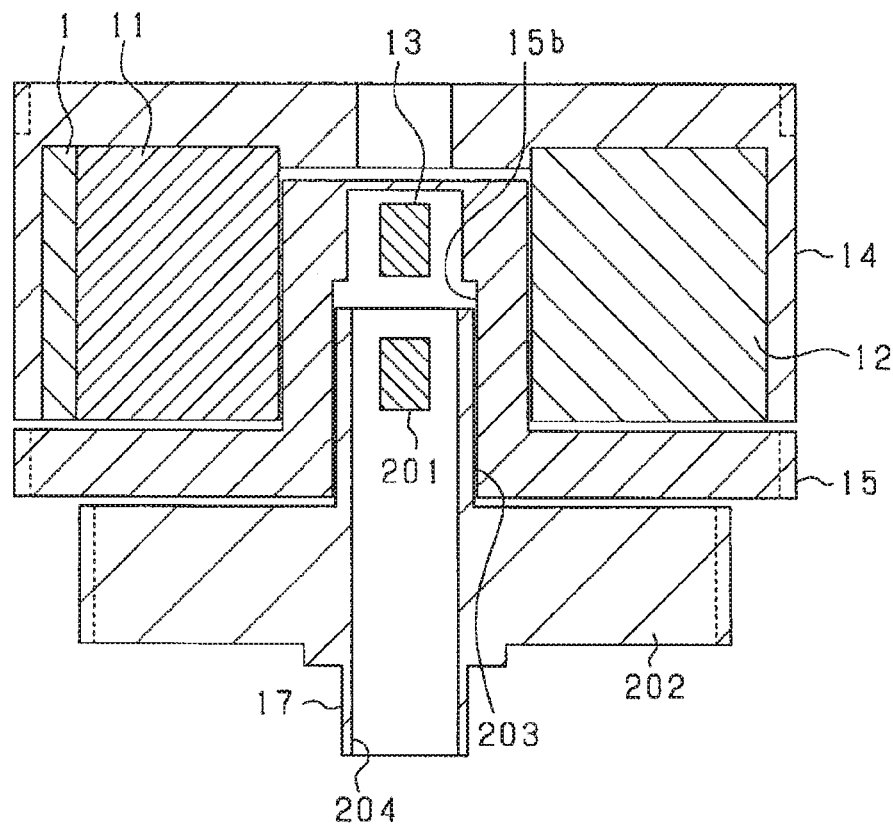
FIG. 12B is a cross-sectional view showing the torque detector according to at least one embodiment.

As shown in FIG. 12B, a second coupling portion 15 according to the fourth embodiment is provided with no second rotation shaft 17. The other configuration is substantially the same as that of the first embodiment, and therefore a description of the other configuration will be omitted.

<Fourth Coupling Portion 202>

As shown in FIG. 12A, the fourth coupling portion 202 is a gear (spur gear) formed in a disc shape and provided with teeth on an outer circumference of the fourth coupling portion 202, and is disposed so as to overlap with the second coupling portion 15 concentrically in the axial direction. At this time, the fourth coupling portion 202 is disposed on a side of the second coupling portion 15 opposite to the first coupling portion 14.

The fourth coupling portion 202 is configured to rotate about the second rotation shaft 17 provided in the fourth coupling portion 202. The second rotation shaft 17 is formed so as to extend in the center of the fourth coupling portion 202 along the axial direction on a side opposite to the second coupling portion 15. The second rotation shaft 17 is rotatably fixed through a bearing (not shown) or the like. The second rotation shaft 17 is provided on the radially outer side of the steering shaft 40, and is parallel to the steering shaft 40. The second rotation shaft 17 is provided coaxially with the first rotation shaft 16.

The fourth coupling portion 202 is configured to mesh with a fourth gear 202a fixed to the outer periphery of the output shaft 43 so as to rotate integrally with the output shaft 43. For that reason, the fourth coupling portion 202 is coupled to the output shaft 43 so as to rotate in conjunction with the rotation of the output shaft 43.

The gear ratio of the fourth coupling portion 202 to the fourth gear 202a is 60 to 40. In other words, a ratio of the rotation of the fourth coupling portion 202 to the rotation of the output shaft 43 is 2:3, and when the output shaft 43 makes two rotations, the fourth coupling portion 202 makes three rotations. In other words, the ratio of the rotation of the fourth coupling portion 202 to the rotation of the output shaft 43 is different from the ratio of the rotation of the second coupling portion 15 to the rotation of the output shaft 43.

As shown in FIG. 12B, a protrusion portion 203 protruding toward the second coupling portion 15 along the axial direction is provided at the center of the fourth coupling portion 202. The protrusion portion 203 is configured to be insertable into a through hole 15b of the second coupling portion 15. The fourth coupling portion 202 is provided with a through hole 204 along the axial direction. The angular sensor 201 is accommodated and fixed in the through hole 204.

<Angular Sensor 201>

The angular sensor 201 is the same as the angular sensor 101 of the third embodiment. The angular sensor 201 is fixed in a state of being accommodated in the through hole 204 of the fourth coupling portion 202. For that reason, when the fourth coupling portion 202 rotates in conjunction with the rotation of the output shaft 43, the angular sensor 201 rotates integrally with the fourth coupling portion 202 about the second rotation shaft 17. In other words, the angular sensor 201 is coupled to the output shaft 43 through the fourth coupling portion 202 so as to rotate in conjunction with the rotation of the output shaft 43.

For that reason, the center of rotation of the angular sensor 201 coincides with the center of rotation of the fourth coupling portion 202, and the center of rotation of the angular sensor 201 is parallel to the steering shaft 40 on the radially outer side of the steering shaft 40. As described above, the rotation center of the angular sensor 201 coincides with the rotation center of the magnetic yoke 112.

The angular sensor 201 is disposed between the magnet 11 and the facing portion 12b of the magnetic yoke 12 in a state of being accommodated in the through hole 204. More specifically, the magnetic sensor 13 is disposed at the rotation center of the magnetic yoke 12. In other words, the angular sensor 201 is disposed at the rotation center of the fourth coupling portion 202. In the axial direction, the angular sensor 201 is disposed at a position overlapping with the facing portion 12b of the magnetic yoke 12 and the magnet 11. For that reason, the angular sensor 201 is disposed at an intermediate point (a position equidistant from each other) between the N pole of the magnet 11 and the facing portion 12b of the magnetic yoke 12.

The angular sensor 201 is arranged so that the detection surface 201a of the angular sensor 201 is parallel to the lines of magnetic force from the N pole toward the facing portion 12b of the magnetic yoke 112 in the initial state in which the torsional torque is not generated.

Further, when the angular sensor 201 is viewed from the axial direction, the angular sensor 201 is disposed such that the center of the detection surface 201a coincides with the rotation center of the magnetic yoke 12 in the width direction of the angular sensor 201 (the radial direction of the magnetic yoke 12). When the angular sensor 201 rotates together with the fourth coupling portion 202 with the rotation of the output shaft 43, the detection surface 201a of the angular sensor 201 also rotates about the second rotation shaft 17. The fourth coupling portion 202 is made of a non-magnetic material (for example, aluminum) and is configured to allow the lines of magnetic force from the outside to pass through the fourth coupling portion 202.

<Detection Method>

Now, detection of the rotation angle of the output shaft 43 by the angular sensor 201 will be described. First, a case in which the output shaft 43 is not rotated will be described. In that case, the detection surface 201a of the angular sensor 201 is disposed so as to be parallel to a straight line extending from the N pole of the magnet 11 to the facing portion 12b at an intermediate point between the N pole of the magnet 11 and the facing portion 12b of the magnetic yoke 12. Therefore, the magnetic flux density detected by the angular sensor 201 is zero (or a value close to zero as far as possible).

When the output shaft 43 is rotated, the second coupling portion 15 and the fourth coupling portion 202 also rotate in conjunction with the output shaft 43. However, since the speed reduction ratio is different, a torsional displacement occurs between the second coupling portion 15 and the fourth coupling portion 202 in accordance with the rotation angle of the output shaft 43. When the torsional displacement occurs, the detection surface 201a of the angular sensor 201 rotates relative to the magnetic yoke 12 or the like in accordance with the torsional displacement between the second coupling portion 15 and the fourth coupling portion 202.

For that reason, the angle formed by the straight line extending from the N pole of the magnet 11 to the facing portion 12b of the magnetic yoke 12 and the detection surface 201a changes in accordance with the torsional displacement between the second coupling portion 15 and the fourth coupling portion 202.

Therefore, the magnetic flux density detected by the angular sensor 201 changes in accordance with the torsional displacement generated in accordance with the rotation angle of the output shaft 43. When the rotation direction is reversed, the same is applied except that the direction (polarity) of the magnetic flux density is only reversed. For that reason, the rotation angle of the output shaft 43 can be detected based on the difference between the magnetic flux density detected by the angular sensor 201 and the speed reduction ratio. The rotation angle of the input shaft 41 can be calculated based on the torsional displacement of the torsion bar 42.

The configuration described above obtains the following effects.

As a result, with the provision of the angular sensor 201, the torsional torque can be detected and the rotation angle of the output shaft 43 can be detected. In this case, the second coupling portion 15 can be used.

Other Embodiments

The present disclosure is not limited to the embodiments described above, and may be implemented as follows, for example. In the following description, parts identical or equivalent to each other in the respective embodiments are denoted by the same reference numerals, and a description of the parts denoted by the same reference numerals will be referred to.

Figure 13:
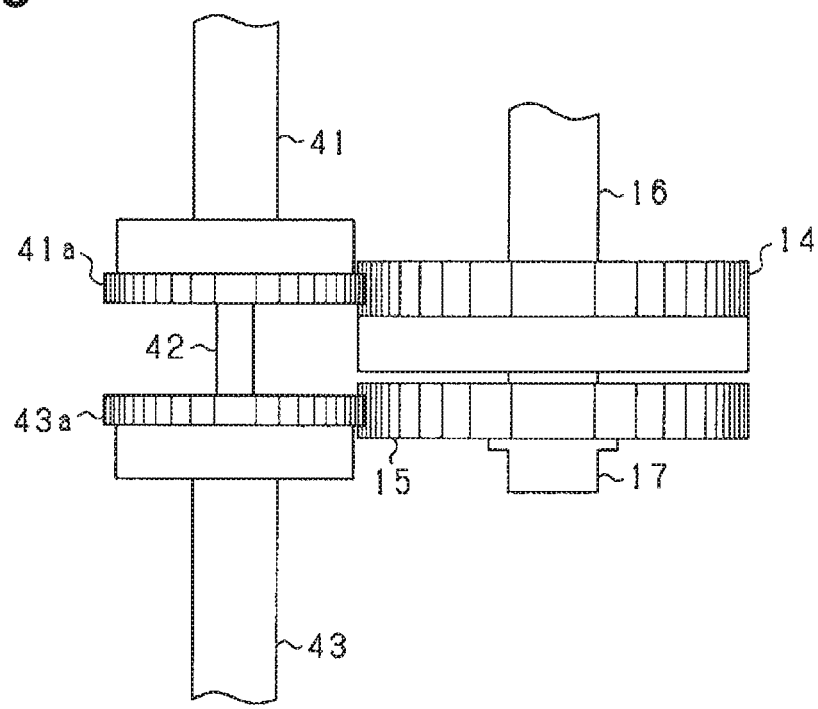
FIG. 13 is a side view showing the torque detector according to at least one embodiment.
Figure 14:
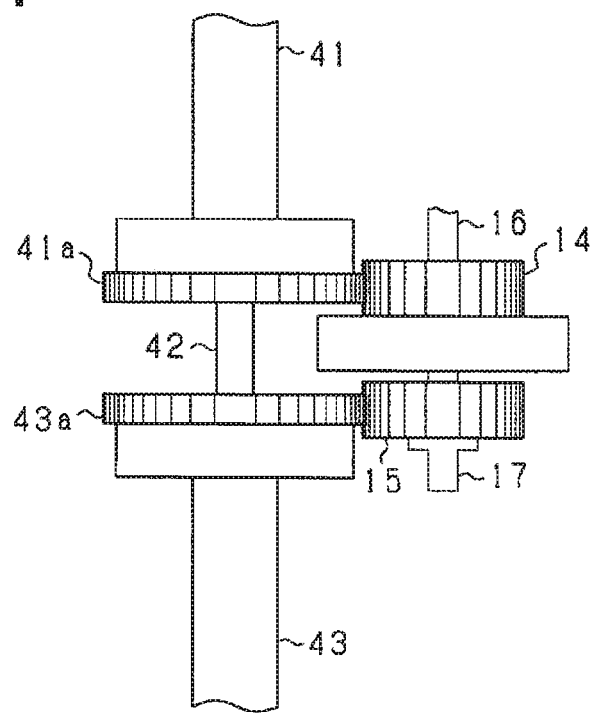
FIG. 14 is a side view showing the torque detector according to at least one embodiment.

In the first, third and fourth embodiments, as shown in FIG. 13, the ratio of the rotation of the magnetic yoke 12 to the rotation of the input shaft 41 may be set to be smaller than 1. That is, the gear ratio may be increased. This makes it difficult for the magnetic yoke 12 to rotate with respect to the rotation of the input shaft 41, so that the twist of the wiring connected to the magnetic sensor 13 can be reduced. As shown in FIG. 14, the ratio of the rotation of the magnetic yoke 12 to the rotation of the input shaft 41 may be set to be larger than 1. That is, the gear ratio may be reduced. This makes it easier to rotate the magnetic yoke 12 relative to the rotation of the input shaft 41, thereby amplifying the torsional displacement. This makes it possible to improve the detection accuracy of the torsional torque. Further, this makes it possible to downsize the first coupling portion 14.

In the embodiments described above, the shape of the magnetic yoke 12 may be arbitrarily changed. Although the magnetic yoke 12 is formed in an annular shape, the magnetic yoke 12 may be formed in an arc shape. Further, the magnetic yoke 12 is not necessarily to have the annular shape, but may have an annular shape. The facing portion 12b may also protrude from the inner edge of the annular portion 12a to the magnet 11, but may not protrude.

In the embodiments described above, the S pole and the N pole of the magnet 11 may be changed.

In the embodiment described above, the S pole of the magnet 11 is in contact with the magnetic yoke 12, but may be out of contact with the magnetic yoke 12.

In the embodiment described above, the detection surface 13a of the magnetic sensor 13 is disposed so as to be parallel to the straight line extending from the N pole to the facing portion 12b in the initial state, but may not be parallel to the straight line. In addition, although the detection surface 13a is disposed to be parallel to the lines of magnetic force, the detection surface 13a may not be parallel to the lines of magnetic force. For example, the detection surface 13a may be orthogonal to the lines of magnetic force.

In the first, third, and fourth embodiments, the magnetic sensor 13 is disposed at the rotation center of the magnetic yoke 12, but the magnetic sensor 13 may not be disposed at the rotation center as long as the magnetic sensor 13 is disposed between the N pole and the facing portion 12b. The magnetic sensor 13 may be spaced from the center of rotation at a predetermined distance in the radial direction. In addition, the magnetic sensors 13 may be displaced in the radial direction (width direction).

Figure 15:
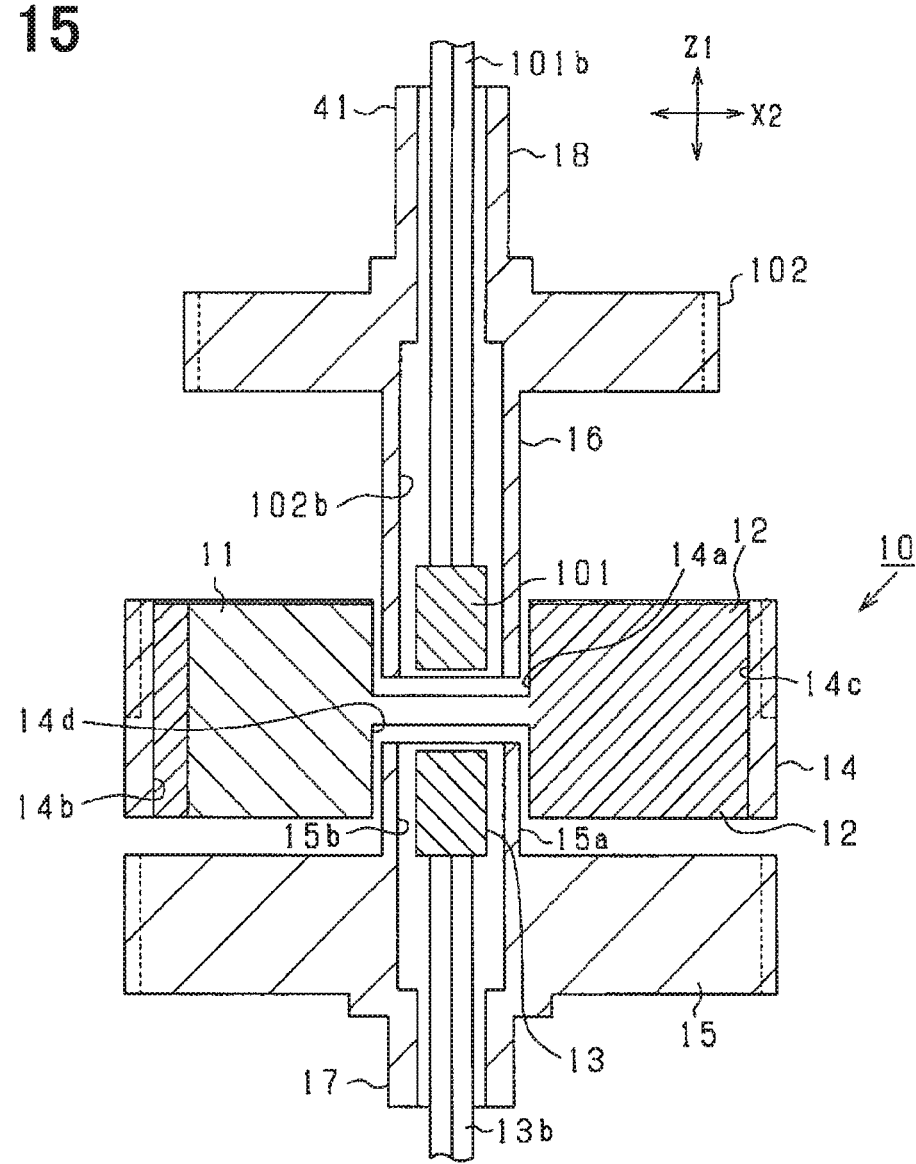
FIG. 15 is a vertical cross-sectional view showing the torque detector according to at least one embodiment.

In the third embodiment, instead of the magnetic yoke 112 and the magnet 111, the magnetic yoke 12 and the magnet 11 may be used for the angular sensor 101. For example, as shown in FIG. 15, the angular sensor 101 may be disposed between the N pole of the magnet 11 and the facing portion 12b of the magnetic yoke 12.

In the third embodiment, the first gear 41a and the third gear 41b may be integrated together.

In the embodiment described above, the input shaft 41 and the first coupling portion 14 are coupled with each other through a gear, but may be coupled with each other through a drive belt. The output shaft 43 and the second coupling portion 15 may be similarly coupled to each other through a drive belt.

In the magnet 11 of the above embodiment, an area of the surface (the surface of the first pole) facing the facing portion 12b may be formed to be larger than an area of the surface (the surface of the second pole) facing the N pole in the facing portion 12b. In other words, the area of the facing portion 12b may be set to be smaller than that of the N pole of the magnet 11. As a result, the lines of magnetic force emitted from the magnet 11 can be collected in the facing portion 12b, and the detected magnetic flux density can be increased. If the magnetic flux density is increased, the influence of external noise can be inhibited. In addition, a change in the magnetic flux density based on a change in the rotation angle can also be easily detected. Therefore, the deterioration of the detection accuracy of the torsional torque can be further reduced.

Figure 16:
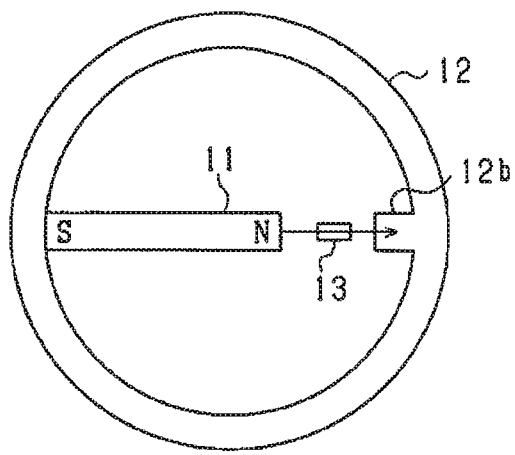
FIG. 16 is a schematic diagram showing the torque detector according to at least one embodiment.

In the embodiment described above, if the magnetic sensor 13 is sandwiched between the N pole of the magnet 11 and the facing portion 12b, the N-pole of the magnet 11 is not required to face the facing portion 12b across the rotation center of the magnetic yoke 12. For example, as shown in FIG. 16, the N pole and the facing portion 12b may be disposed to face each other across the magnetic sensor 13 with a predetermined position on the outer side in the radial direction from the rotation center as the center.

Figure 17A:
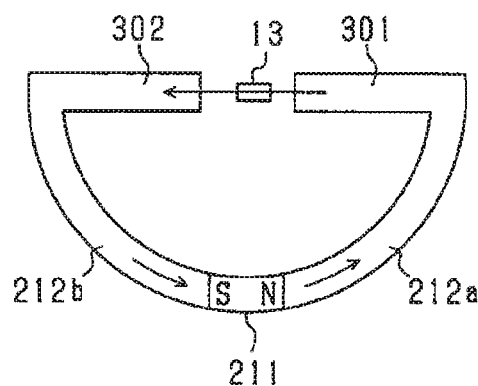
FIG. 17A is a schematic diagram showing the torque detector according to at least one embodiment.

In the embodiment described above, the first pole of the magnetic flux generation unit 1 is set as the N pole of the magnet 11, but the magnetic yoke 12 may be provided with the first pole and the second pole. For example, a configuration as shown in FIG. 17A may be employed. In other words, a pair of arc-shaped magnetic yokes 212a and 212b is provided. An angle from one end to the other end of the magnetic yokes 212a and 212b in the circumferential direction is approximately 45 degrees. At one end of the magnetic yokes 212a and 212b in the circumferential direction, a first protrusion portion 301 and a second protrusion portion 302 are provided which are formed to extend toward the center of the rotation direction, respectively. A portion of the first protrusion portion 301 on the radial direction center side corresponds to the first pole, and a portion of the second protrusion portion 302 on the center side in the radial direction corresponds to the second pole. The first protrusion portion 301 and the second protrusion portion 302 are disposed to face each other across the magnetic sensor 13. The first protrusion portion 301 and the second protrusion portion 302 are disposed to face each other across the rotation center.

The magnet 211 is connected to the other ends of the magnetic yokes 212a and 212b in the circumferential direction. The magnet 211 is formed in a substantially circular arc shape, and has an N pole connected to the magnetic yoke 212a and an S pole connected to the magnetic yoke 212b. As a result, a magnetic flux from the N pole passes through the magnetic yoke 212a and is emitted from the first protrusion portion 301. The magnetic flux emitted from the first protrusion portion 301 passes through the magnetic sensor 13, enters the second protrusion portion 302, passes through the magnetic yoke 212b, and enters the S pole of the magnet 211. The detection method is the same as that of the above embodiment. The magnetic yoke 12 and the magnet 11 are fixed, and a relative position of the magnetic yoke 12 and the magnet 11 does not change with the rotation of the input shaft 41.

Figure 17B:
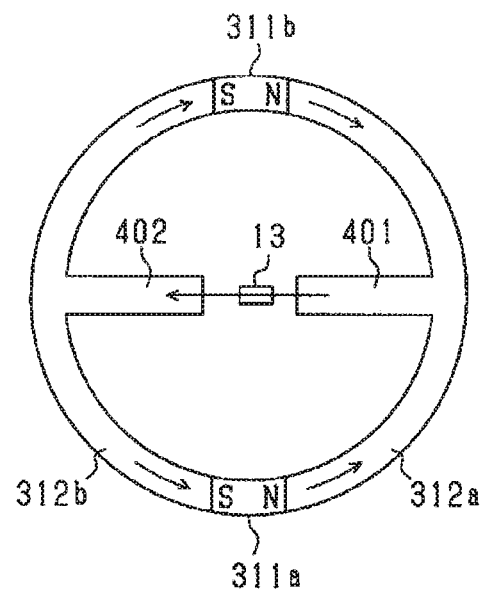
FIG. 17B is a schematic diagram showing the torque detector according to at least one embodiment.

A configuration shown in FIG. 17B may be employed. In other words, a pair of arc-shaped magnetic yokes 312a and 312b is provided. An angle from one end to the other end of the magnetic yokes 312a and 312b in the circumferential direction is approximately 90 degrees. The central portion of the magnetic yokes 312a and 312b in the circumferential direction is provided with a first protrusion portion 401 and a second protrusion portion 402, respectively, formed to extend toward the center of the rotation direction. A portion of the first protrusion portion 401 on the center side in the radial direction corresponds to the first pole, and a portion of the second protrusion portion 402 on the center side in the radial direction corresponds to the second pole. The first protrusion portion 401 and the second protrusion portion 402 are disposed to face each other across the magnetic sensor 13. In addition, the first protrusion portion 401 and the second protrusion portion 402 are disposed to face each other across the rotation center.

The N poles of the respective magnets 311a and 311b are connected to both ends of the magnetic yoke 312a in the circumferential direction. Similarly, the S poles of the respective magnets 311a and 311b are connected to both ends of the magnetic yoke 312b in the circumferential direction. The magnets 311a and 311b are formed in an arc shape. As a result, the magnetic flux from the N pole passes through the magnetic yoke 312a, passes through the first protrusion portion 401 and the second protrusion portion 402, passes through the magnetic yoke 312b, and enters the S pole. The detection method is the same as that of the above embodiment. The magnetic yoke 12 and the magnet 11 are fixed, and a relative position of the magnetic yoke 12 and the magnet 11 does not change with the rotation of the input shaft 41.

Figure 18:
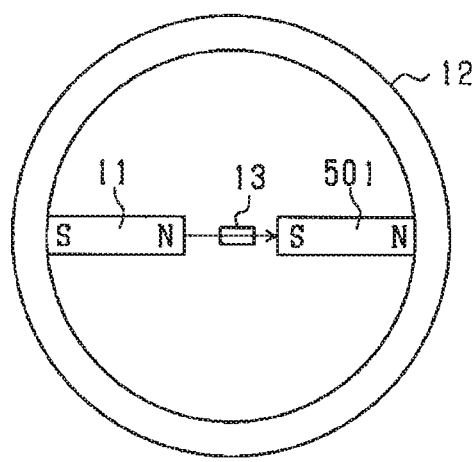
FIG. 18 is a schematic diagram showing the torque detector according to at least one embodiment.

In the embodiment described above, a plurality of magnets 11 may be provided, and a magnet may be employed instead of the facing portion 12b. For example, as shown in FIG. 18, a rod-shaped magnet 501 may be employed instead of the facing portion 12b. In the magnet 501, the rotation center side is an S pole. The N pole of the magnet 501 is fixed to the inside of the magnetic yoke 12. In that case, the magnet 11 corresponds to the first magnet, and the magnet 501 corresponds to the second magnet. In the case of the configuration shown in FIG. 18, since a magnetic flux enters and exits between the magnet 11 and the magnet 501, the magnetic yoke 12 does not need to be made of a magnetic material, and may be formed of a simple case member made of a non-magnetic material.

In the embodiment described above, the lines of magnetic force from the first pole to the second pole of the magnetic flux generation unit 1 may not be kept constant as long as the magnetic flux density changes regularly in accordance with the torsional torque.

Figure 19:
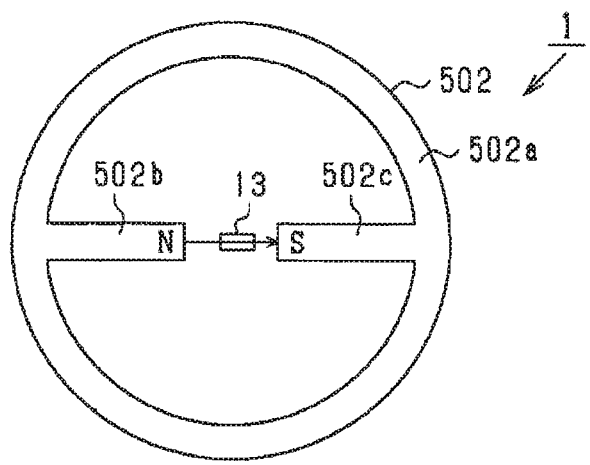
FIG. 19 is a schematic diagram showing the torque detector according to at least one embodiment.

In the embodiment described above, the magnetic flux generation unit 1 may be configured by one magnet 502 as shown in FIG. 19. The magnet 502 includes an annular portion 502a and a first protrusion portion 502b and a second protrusion portion 502c protruding from the inner side of the annular portion 502a to the center of rotation. The first protrusion portion 502b is a first pole (for example, N pole), and the second protrusion portion 502c is a second pole (for example, S pole).

Further, the torque detector may be configured as described below. A torque detector detects a torsional torque between a first shaft and a second shaft based on a torsional displacement of an elastic member coaxially connecting the first shaft and the second shaft. The torque detector includes: a yoke that rotates with rotation of the first shaft; a magnet that rotates with rotation of the first shaft and provided in a state in which a relative position of the magnet to the yoke is fixed; and a magnetic sensor that includes a detection surface for detecting a magnetic flux density and rotates with rotation of the second shaft. A facing portion of the yoke and a first pole which is one of first and second different poles of the magnet are located to face each other across a rotation center of the yoke at a predetermined distance. The magnetic sensor is disposed between the first pole and the facing portion.

Comparative Example

A comparative example will be described below. For example, in a torque detector of the comparative example, when a torsion bar connecting an input shaft and an output shaft is twisted, a pair of yokes is displaced in a circumferential direction relative to a multipolar magnet. At this time, a magnetic sensor detects a magnetic flux density between the yokes, and detects a torsional torque based on a change in the magnetic flux density.

When the yokes are displaced relative to the magnet in the circumferential direction, the yokes collect a magnetic flux from the magnet and pass the magnetic flux within the yokes. Therefore, unless the yokes are made of a material having the smallest magnetic hysteresis, the magnetic flux density detected by the magnetic sensor may vary even with the same torsional torque due to an influence of the magnetic hysteresis, and a detection accuracy of the torsional torque may deteriorate. As a result, there is a problem that the degree of freedom of material selection is low.

On the other hand, according to the torque detector of the present disclosure, the detection accuracy of the torsional torque can be improved. The torque detector according to the present disclosure detects the torsional torque between the first shaft and the second shaft based on the torsional displacement of the elastic member coaxially connecting the first shaft and the second shaft. The torque detector rotates with the rotation of the first shaft, and includes the magnetic flux generation unit having the first pole and the second pole through which the lines of magnetic force enter and exit, and the magnetic sensor that includes the detection surface for detecting the magnetic flux or the magnetic flux density and rotates with the rotation of the second shaft. The first pole and the second pole are disposed to face each other across the magnetic sensor.

According to the configuration described above, the angle (incident angle) formed by the straight line extending from the first pole to the second pole and the detection surface of the magnetic sensor changes in accordance with the rotation of the second shaft to the first shaft. The number of lines of magnetic force passing through the detection surface changes in accordance with the change in the angle. In other words, the magnetic flux density changes. The torque detector can detect the torsional displacement based on the change in the magnetic flux density.

In the configuration described above, since the magnetic flux density changes based on the angle formed by the straight line extending from the first pole to the second pole and the detection surface of the magnetic sensor, there is no need to change the magnetic flux density from the first pole to the second pole. If the magnetic flux density from the first pole to the second pole is not changed, the magnetic flux density experienced by the magnetic sensor is not affected by the magnetic hysteresis. In other words, when the magnetic flux density from the first pole to the second pole is not changed, the magnetic flux density detected by the magnetic sensor does not vary when the torsional torque is the same. In other words, when the torsional torque is detected in the configuration described above, the influence of the magnetic hysteresis can be reduced. For that reason, even if a material having a large magnetic hysteresis of the yoke is selected, a decrease in the detection accuracy of the torsional torque can be reduced.

What is claimed is:

1. A torque detector for detecting a torsional torque between a first shaft and a second shaft based on a torsional displacement of an elastic member coaxially connecting the first shaft and the second shaft, the torque detector comprising:
   a magnetic flux generation unit configured to rotate with rotation of the first shaft and comprises a first pole and a second pole into and out of which lines of magnetic force enter and exit; and
   a magnetic sensor configured to rotate with rotation of the second shaft and comprises a detection surface for detecting a magnetic flux or a magnetic flux density, wherein
   the first pole and the second pole are arranged to face each other such that the magnetic sensor is between the first pole and the second pole.

2. The torque detector according to claim 1, wherein the lines of magnetic force entering and exiting between the first pole and the second pole are constant regardless of the torsional torque.

3. The torque detector according to claim 1, wherein the detection surface of the magnetic sensor is placed along the lines of magnetic force from the first pole to the second pole in an initial state in which no torsional torque is generated.

4. The torque detector according to claim 1, wherein the detection surface of the magnetic sensor is placed along a straight line extending from the first pole to the second pole in an initial state in which no torsional torque is generated.

5. The torque detector according to claim 1, wherein the magnetic flux generation unit is a magnet having the first pole and the second pole.

6. The torque detector according to claim 1, wherein the magnetic flux generation unit includes a yoke configured to rotate with rotation of the first shaft, and a magnet configured to rotate with the rotation of the first shaft and provided in a state in which a relative position of the magnet to the yoke is fixed,
one of different magnetic poles of the magnet corresponds to the first pole,
a facing portion provided on the yoke and facing and spaced at predetermined distance from the first pole corresponds to the second pole, and
the first pole and the second pole are disposed at positions facing each other across a rotation center of the yoke.

7. The torque detector according to claim 6, wherein the yoke is arcuate or annular, and
the magnet is disposed inside the yoke, and another of the different magnetic poles of the magnet is disposed to face the yoke on a side of the magnet that faces away from the rotation center of the yoke.

8. The torque detector according to claim 7, wherein the other of the different magnetic poles of the magnet is fixed to be joined to the yoke.

9. The torque detector according to claim 6, wherein the facing portion protrudes from an inner edge of the yoke toward the first pole.

10. The torque detector according to claim 1, wherein an area of a surface of the second pole facing the first pole is smaller than an area of a surface of the first pole facing the second pole.

11. The torque detector according to claim 1, wherein a rotation axis of the magnetic flux generation unit is coaxial with the first shaft and the second shaft, and
the magnetic sensor is disposed outside the elastic member in a radial direction of the first shaft and the second shaft.

12. The torque detector according to claim 1, wherein a rotation axis of the magnetic flux generation unit is disposed along the first shaft and the second shaft on a radially outer side of the first shaft and the second shaft, and
the magnetic sensor is disposed at a rotation center of the magnetic flux generation unit.

13. The torque detector according to claim 12, wherein
the magnetic flux generation unit is coupled to the first shaft through a first coupling portion and rotatable in accordance with rotation of the first shaft,
the magnetic sensor is coupled to the second shaft through a second coupling portion and rotatable in accordance with rotation of the second shaft, and
a ratio of rotation of the magnetic flux generation unit to rotation of the first shaft is the same as a ratio of rotation of the magnetic sensor to rotation of the second shaft.

14. The torque detector according to claim 13, wherein the ratio of the rotation of the magnetic flux generation unit to the rotation of the first shaft is greater than 1.

15. The torque detector according to claim 13, wherein the ratio of the rotation of the magnetic flux generation unit to the rotation of the first shaft is smaller than 1.

16. The torque detector according to claim 12, further comprising:
an angular sensor that detects a rotation angle of the first shaft; wherein
the angular sensor is a sensor having a detection surface for detecting a magnetic flux or a magnetic flux density;
the angular sensor is coupled to the first shaft through an angular sensor coupling portion and rotatable in accordance with rotation of the first shaft,
a ratio of rotation of the magnetic sensor to rotation of the first shaft is different from a ratio of rotation of the angular sensor to the rotation of the first shaft, and
the angular sensor is disposed between the first pole and the second pole.

17. The torque detector according to claim 12, further comprising:
an angular sensor that detects a rotation angle of the second shaft; wherein
the angular sensor is a sensor having a detection surface for detecting a magnetic flux or a magnetic flux density,
the angular sensor is coupled to the second shaft through an angular sensor coupling portion and rotatable in accordance with rotation of the second shaft,
a ratio of rotation of the magnetic sensor to rotation of the second shaft is different from a ratio of rotation of the angular sensor to the rotation of the second shaft, and
the angular sensor is disposed between the first pole and the second pole.

18. A torque detector for detecting a torsional torque between a first shaft and a second shaft based on a torsional displacement of an elastic member coaxially connecting the first shaft and the second shaft, the torque detector comprising:
a magnetic flux generation unit including a first magnet configured to rotate with rotation of the first shaft, and a second magnet configured to rotate with rotation of the first shaft and provided in a state in which a relative position of the second magnet to the first magnet is fixed; and
a magnetic sensor configured to rotate with rotation of the second shaft and comprises a detection surface for detecting a magnetic flux density, wherein
a first pole of different poles of the first magnet and a second pole of different poles of the second magnet having a polarity opposite to the first pole are disposed to face each other such that the magnetic sensor is between the first pole and the second pole.

* * * * *